US009523302B2

(12) United States Patent
Mende et al.

(10) Patent No.: US 9,523,302 B2
(45) Date of Patent: Dec. 20, 2016

(54) OFF GAS PURIFICATION DEVICE

(75) Inventors: Takeshi Mende, Shizuoka (JP);
Toshinori Okajima, Shizuoka (JP);
Yasuyuki Banno, Shizuoka (JP);
Makoto Nagata, Shizuoka (JP)

(73) Assignee: N.E. CHEMCAT CORPORATION, Tokyo (JP)

( * ) Notice: Subject to any disclaimer, the term of this patent is extended or adjusted under 35 U.S.C. 154(b) by 510 days.

(21) Appl. No.: 14/114,108

(22) PCT Filed: Jan. 11, 2012

(86) PCT No.: PCT/JP2012/050314
§ 371 (c)(1),
(2), (4) Date: Oct. 25, 2013

(87) PCT Pub. No.: WO2012/147376
PCT Pub. Date: Nov. 1, 2012

(65) Prior Publication Data
US 2014/0050627 A1 Feb. 20, 2014

(30) Foreign Application Priority Data

Apr. 28, 2011 (JP) ................................. 2011-101047

(51) Int. Cl.
*F01N 3/20* (2006.01)
*B01D 53/94* (2006.01)
(Continued)

(52) U.S. Cl.
CPC ............ *F01N 3/208* (2013.01); *B01D 53/944* (2013.01); *B01D 53/9477* (2013.01); *B01J 23/44* (2013.01);
(Continued)

(58) Field of Classification Search
None
See application file for complete search history.

(56) References Cited

U.S. PATENT DOCUMENTS 6,823,663 B2 11/2004 Hammerle et al.
6,928,806 B2 8/2005 Tennison et al.
(Continued)

FOREIGN PATENT DOCUMENTS

DE 102008040000 A1 6/2009
EP 2123345 A1 11/2009
(Continued)

OTHER PUBLICATIONS

European Supplementary Search Report dated Oct. 6, 2014, issued in corresponding EP application No. 12777161.6 (7 pages).
(Continued)

*Primary Examiner* — Walter D Griffin
*Assistant Examiner* — Jelitza Perez
(74) *Attorney, Agent, or Firm* — Westerman, Hattori, Daniels & Adrian, LLP

(57) ABSTRACT

An exhaust gas purification catalyst apparatus. The apparatus has a noble metal component for oxidizing NOx in an exhaust gas discharged from a diesel engine, a reducing agent spraying means for supplying the reducing agent selected from a urea component or an ammonia component, and a selective reduction catalyst (SCR) not comprising a noble metal for removing by reduction NOx by contacting with the reducing agent, in this order from the upstream side of an exhaust gas passage. Activity of the selective reduction catalyst (SCR) is maintained by setting that the noble metal component of the oxidation catalyst (DOC) comprises platinum and palladium, and ratio of platinum particles existing alone is 20% or less, or average particle diameter of the noble metal is 4 nm or larger, and by suppressing volatilization of platinum from the oxidation catalyst (DOC), even when catalyst bed temperature increases up to 900° C.

11 Claims, 5 Drawing Sheets

(51) Int. Cl.
  *F01N 3/10* (2006.01)
  *F01N 3/035* (2006.01)
  *B01J 37/02* (2006.01)
  *B01J 23/44* (2006.01)
  *B01J 29/72* (2006.01)
  *B01J 35/00* (2006.01)
  *B01J 35/02* (2006.01)
  *B01J 35/04* (2006.01)
  *F01N 13/00* (2010.01)

(52) U.S. Cl.
  CPC ........... *B01J 29/7215* (2013.01); *B01J 35/006* (2013.01); *B01J 35/023* (2013.01); *B01J 35/04* (2013.01); *B01J 37/0201* (2013.01); *B01J 37/0242* (2013.01); *F01N 3/035* (2013.01); *F01N 3/103* (2013.01); *F01N 3/2066* (2013.01); *F01N 13/009* (2014.06); *F01N 13/0097* (2014.06); *B01D 53/9418* (2013.01); *B01D 2255/1021* (2013.01); *B01D 2255/1023* (2013.01); *B01D 2255/50* (2013.01); *B01D 2255/9155* (2013.01); *B01D 2255/9202* (2013.01); *B01D 2258/012* (2013.01); *F01N 2510/06* (2013.01); *F01N 2510/068* (2013.01); *F01N 2610/02* (2013.01); *Y02T 10/24* (2013.01)

(56) References Cited

U.S. PATENT DOCUMENTS

| | | |
|---|---|---|
| 2008/0124264 A1 | 5/2008 | Ikeda et al. |
| 2008/0271441 A1 | 11/2008 | Nagata et al. |
| 2009/0155151 A1 | 6/2009 | Liu et al. |
| 2009/0269265 A1 | 10/2009 | Ando et al. |
| 2011/0099975 A1* | 5/2011 | Bailey ................. B01D 53/944 60/274 |

FOREIGN PATENT DOCUMENTS

| | | |
|---|---|---|
| EP | 2520354 A1 | 11/2012 |
| JP | 01-318715 A | 12/1989 |
| JP | 05-038420 A | 2/1993 |
| JP | 08-038897 A | 2/1996 |
| JP | 08-103636 A | 4/1996 |
| JP | 09-262467 A | 10/1997 |
| JP | 2002-502927 A | 1/2002 |
| JP | 2008-155204 A | 7/2008 |
| JP | 2008-272659 A | 11/2008 |
| JP | 2009-262098 A | 11/2009 |
| WO | 99/39809 A1 | 8/1999 |

OTHER PUBLICATIONS

International Search Report dated Apr. 24, 2012, issued in corresponding application No. PCT/JP2012/050314.
Nova, Isabella, et al., "$NH_3$—$NO/NO_2$ chemistry over V-based catalysts and its role in the mechanism of the Fast SCR reaction", Catalysis Today, 2006, vol. 225, pp. 3-12, cited in Specification.
Jen, Hung-Wen, et al., "Detection, Origin and Effect of Ultra-Low Platinum Contamination on Diesel-SCR Catalysts", SAE Ford Motor Company, 2008, cited in Specification.
Cavataio, Giovanni, et al., "Impact and Prevention of Ultra-Low Contamination of Platinum Group Metals on SCR Catalysts Due to DOC Design", SAE Ford Motor Company, 2009, cited in Specification.
Takahashi, Naoki, et al., "Infulence of Support Materials and Aging on NO Oxidation Performance of Pt Catalysts under an Oxidative Atmosphere at Low Temperature", Journal of Chemical Engineering of Japan, 2007, vol. 40, No. 9, pp. 741-748.
Jehn, Hermann, "High Temperature Behavior of Platinum Group Metals in Oxidizing Atmospheres", Journal of the Less-Common Metals, Netherlands, 1984, vol. 100, pp. 321-339, cited in Specification.

* cited by examiner

OFF GAS PURIFICATION DEVICE

TECHNICAL FIELD

The present invention relates to an exhaust gas purification apparatus, in more detail, the present invention relates to an exhaust gas purification catalyst apparatus using an oxidation catalyst and a selective reduction catalyst which is capable of efficiently purifying, for a long period of time, hydrocarbons, carbon monoxide, nitrogen oxides, and particulate components such as soot included in exhaust gas from a lean burn engine.

BACKGROUND ART

In exhaust gas discharged from a lean burn engine such as a boiler, a gas turbine, a lean burn-type gasoline engine, or a diesel engine, various harmful substances derived from fuel or combustion air are included. Such harmful substances include a hydrocarbon (HC), a soluble organic fraction (it may also be called SOF), soot, carbon monoxide (CO), nitrogen oxides ($NO_x$) and the like. Regulations on discharge amount of these harmful components have been strengthened year by year, and as a purification method of these harmful components, there has been practically used a method for purifying exhaust gas by making it contacted with a catalyst.

In such a lean burn engine, there has also been investigated on suppression of generation amount of harmful substances by controlling kinds of fuel, supply amount, and supply timing of fuel, amount of air or the like. However, satisfactory purification of exhaust gas has not been attained by a conventional catalyst or a control method. In particular, in a lean burn engine, nitrogen oxides are easily discharged and regulation thereof has been strengthening more and more, however, in the case of a diesel engine loaded on an automobile, it is difficult to suppress discharge of the harmful substances by conventional $NO_x$ purification technology, because operation condition thereof is always changing.

Further, in recent year, regulations of discharge amount of carbon dioxide ($CO_2$), which is the greenhouse effect gas, has been strengthened. Because discharge amount of $CO_2$ is proportional to fuel amount used in engine operation, it has been desired that, in a combustion engine, used amount of fuel is small and has good fuel efficiency. A diesel engine is a combustion engine having good fuel efficiency and small discharge amount of $CO_2$, however, includes a large quantity of $NO_x$ in exhaust gas.

To suppress discharge of $NO_x$ in a diesel engine, it is considered to make air/fuel ratio small, and supply to an engine a large quantity of fuel, which is also a reducing agent, however, it incurs deterioration of fuel efficiency, and also increases discharge of $CO_2$. In addition, such a combustion control cannot utilize advantage of a diesel engine, that is, good fuel efficiency.

As technology for purification of $NO_x$ (hereafter it may be referred to as denitration, or De-$NO_x$), there has been known technology for denitrating by reduction, where exhaust gas including $NO_x$ is contacted with a selective reduction catalyst having titanium oxide, vanadium oxide, zeolite and the like as main components, under presence of ammonia ($NH_3$) component, as a selective reduction method or a Selective Catalytic Reduction (hereafter it may be referred to as SCR) method.

In the SCR, where this $NH_3$ component is used as a reducing agent, $NO_x$ is finally reduced to $N_2$ mainly by the following reaction formulas (1) to (3):

$$4NO + 4NH_3 + O_2 \rightarrow 4N_2 + 6H_2O \quad (1)$$

$$6NO_2 + 8NH_3 + O_2 \rightarrow 7N_2 + 12H_2O \quad (2)$$

$$NO + NO_2 + 2NH_3 \rightarrow 2N_2 + 3H_2O \quad (3)$$

In denitration in exhaust gas, it is theoretically enough that $NH_3/NO_x$ molar ratio is 1.0, in the above denitration reaction formulas (1) to (3), however, in the case of transient engine operation condition in operation of a diesel engine, or in the case where space velocity, temperature of exhaust gas, or temperature of the catalyst surface is not suitable, there is the case where $NH_3/NO_x$ ratio of the $NH_3$ component to be supplied to obtain sufficient denitration performance is inevitably increased, resulting in leakage of unreacted $NH_3$, where a risk of incurring secondary pollution, such as new environmental contamination, has been pointed out. Hereafter, leaked $NH_3$ may be referred to as slip, or $NH_3$ slip.

In such a denitration catalyst system, $NH_3$ gas may be used as the reducing component, however, because $NH_3$ itself has irritating odor or hazardous property, there has been proposed a system for adding urea water, instead of $NH_3$ gas, from the upstream of the denitration catalyst, generating $NH_3$ by pyrolysis or hydrolysis, and having this acted as a reducing agent to exert denitration performance.

Reaction formulas for obtaining $NH_3$ by decomposition of urea in this way are the following (4) to (6). Here, (4) is pyrolysis reaction of urea, (5) is hydrolysis of isocyanic acid and (6) is hydrolysis of urea.

$$NH_2-CO-NH_2 \rightarrow NH_3 + HCNO \quad (4)$$

$$HCNO + H_2O \rightarrow NH_3 + CO_2 \quad (5)$$

$$NH_2-CO-NH_2 + H_2O \rightarrow 2NH_3 + CO_2 \quad (6)$$

Urea is spray supplied as urea water, from the upstream of the SCR catalyst. As described above, because a component contributing to reduction purification of $NO_x$ is mainly $NH_3$, a reaction of $NO_x$ in the SCR catalyst is influenced by decomposition efficiency of urea. Low decomposition efficiency of urea naturally decreases $NO_x$ purification performance, as well as increases used amount of urea, and could induce $NH_3$ slip by unreacted urea.

Against such $NH_3$ slip, it was required to arrange an oxidation catalyst at the latter part of the SCR catalyst, so as to oxidize and purify slipped $NH_3$. However, arrangement of such a catalyst for purification of slipped $NH_3$ leads to cost increase, and it was difficult to secure a loading place of the catalyst, in particular, in an automobile.

In addition, increased amount of slipped $NH_3$ required the catalyst to have high oxidation capability, which then required use of a large quantity of an expensive noble metal such as platinum, which is active species.

In addition, in $NO_x$ purification by the $NH_3$ component, the reaction is accelerated under atmosphere including NO and $NO_2$ each nearly half as in the above formula (3) (NON PATENT LITERATURE 1). However, most of $NO_x$ components discharged from a lean burn engine is nitrogen monoxide (PATENT LITERATURE 1). Therefore, in order to increase concentration of $NO_2$ component in exhaust gas, so as to attain efficient purification of $NO_x$, there has been proposed arranging an NO oxidation means at an exhaust gas passage (PATENT LITERATURE 2).

There has also been proposed a method for purifying harmful particulate components and NO in one catalyst system at the same time, by utilization of such a NO oxidation means. One of them is the one for arranging the oxidation catalyst in exhaust gas passage, arranging a filter at the latter part thereof, spraying the ammonia component at the latter part thereof, and arranging the SCR catalyst at the latter part thereof (PATENT LITERATURE 3).

In addition, purification technology of soot or SOF (they may hereafter be referred to collectively as a "particulate component" or PM: Particulate Matter) influences also on fuel efficiency enhancement of a diesel engine. As for the particulate component, there has practically been used a method for arranging a heat resistant filter (DPF: Diesel Particulate Filter) in exhaust gas passage, and filtering off the particulate component with this filter. The particulate component thus filtered off deposits on the filter, and continued deposition of the particulate component on the filter causes clogging of the filter thus incurring decrease in output of an engine. Accordingly, there has been investigated regeneration of the filter by combustion removal of the particulate component deposited on the filter (PATENT LITERATURE 3, PATENT LITERATURE 4).

In the system of PATENT LITERATURE 3 and PATENT LITERATURE 4, by arranging DPF at the latter part of DOC, the particulate component deposited on the filter is removed by combustion using $NO_2$ in addition to oxygen. Use of $NO_2$, because of starting combustion of the particulate component from low temperature, not only promotes combustion removal of the particulate component but also enables to prevent melting of the filter by decreasing combustion temperature. Among the filters for combustion removal by capturing the particulate component in this way, DPF covered with a catalyst component is also referred to as CSF (Catalyzed Soot Filter).

In addition, there has also been proposed a purification method for combustion removal of the particulate component at the same time as $NO_x$ purification (PATENT LITERATURE 2, PATENT LITERATURE 4). In these methods, there has been proposed such one where an oxidation catalyst, a filter for filtering off particulate components, a supply means of an ammonia component, and a selective-type reduction catalyst, are arranged in this order in an exhaust gas flow, or such one where an oxidation catalyst, a supply means of an ammonia component, a selective-type reduction catalyst, and a filter for filtering off particulate components are arranged in this order in an exhaust gas flow (PATENT LITERATURE 5, PATENT LITERATURE 6). And, also among these systems, there may be the case where CSF catalyzed DPF is used to promote combustion of the particulate component.

In such an arrangement, by oxidation of NO in exhaust gas to $NO_2$ using the oxidation catalyst, combustion removal of the particulate component and reduction purification of $NO_x$ can be performed in one catalyst system at the same time. And, it has been known that a platinum component is effective as an oxidation catalyst component of this NO (PATENT LITERATURE 4, NON PATENT LITERATURE 4).

As such purification method for performing purification of $NO_x$ and combustion removal of the particulate component at the same time, there has been developed the FLENDS system of Nissan Diesel Co., Ltd., or Bluetech of Daimler AG or the like, which is for a diesel automobile application, and prevalence thereof is progressing. In addition, as the reducing component, there is an aqueous solution of urea, having a specified concentration of 31.8 to 33.3% by weight, now on the market as a trade name of "Adblue".

In this way, a purification means for $NO_x$ and the particulate component has been proposed, however, in any of these cases, the object is to enhance efficiency of $NO_x$ purification in SCR by arranging DOC upstream of SCR, and increasing $NO_2$ concentration in exhaust gas.

In addition, in recent years, with strengthening regulation of exhaust gas, there has been increasing tendency of number of catalysts to be used in an exhaust gas purification system corresponding to exhaust gas from a lean burn engine. In particular, in for an automobile, which is a mobile internal combustion engine, there is a problem of limited loading space of an apparatus, or requirements to attain low fuel efficiency and high output. To satisfy these requirements, there are needs for weight reduction and compact sizing of a catalyst per one unit, as well as decrease in pressure drop. The above PATENT LITERATURE has not investigated these problems, and thus cannot be said practical as an exhaust gas purification catalyst.

In recent years, the exhaust gas purification system aiming at purifying $NO_x$, using a reducing component such as an aqueous solution of urea, by increasing concentration of $NO_2$ by an oxidation catalyst, has raised a new problem in view of fuel efficiency enhancement. That is a problem of decrease in reducing performance of $NO_x$, caused by leaking out and adhering of the platinum component used in DOC and/or CSF, to SCR downstream.

In DOC, the noble metal component such as platinum (Pt) or palladium (Pd) is used aiming at oxidation removal of HC or CO in exhaust gas, or oxidation purification of soot or SOF in exhaust gas, respectively, however, DOC also has action of oxidation of NO in exhaust gas to $NO_2$, as described above. Exhaust gas having increased amount of $NO_2$ promotes reduction purification of $NO_x$ in SCR downstream, and combustion of the particulate component at DPF or CSF.

In addition, increase in temperature of exhaust gas using HC in exhaust gas at DOC is effective to promote combustion removal of the particulate component deposited onto DPF or CSF arranged downstream of DOC. Therefore, in an exhaust gas purification system of a diesel engine, there may be the case where HC components are combusted (oxidized) by supplying the HC components to DOC. As a means for using the HC components to increase temperature of exhaust gas in this way, there is a method for supplying relatively more amount of fuel to an engine and generating unburned HC and supply it to DOC; or a method for supplying fuel to DOC by direct spraying.

In addition, increase in temperature of exhaust gas using HC in exhaust gas at DOC is effective to promote combustion removal of the particulate component deposited onto DPF or CSF arranged at the backward of DOC. Therefore, in an exhaust gas purification system of a diesel engine, there may be the case where HC components are combusted (oxidized) by supplying the HC components to DOC. As a means for using the HC components to increase temperature of exhaust gas in this way, there is a method for supplying relatively more amount of fuel to an engine and generating unburned HC and supply it to DOC; or a method for supplying fuel to DOC by direct spraying.

As described above, a diesel engine is a combustion engine having good fuel efficiency and small discharge amount of $CO_2$, however, use of fuel aiming at increasing temperature of exhaust gas deteriorates fuel efficiency, and increases discharge amount of $CO_2$. However, in many cases, temperature of exhaust gas of a diesel engine is 400° C. or lower, which is too low temperature for combustion removal of the particulate component deposited onto DPF (hereafter it may be referred to as regeneration of DPF) using exhaust gas as it is, therefore, to promote combustion of the particulate component, in particular, the soot component, there may be the case of heating exhaust gas at 600° C. or higher (JP-A-2003-148141, paragraphs 0012 and the like). To regenerate DPF or CSF by efficiently combusting the particulate component deposited onto DPF or CSF, it is necessary to frequently repeat it every time when the particulate component deposits onto DPF or CSF, which incurs deterioration of fuel efficiency. In addition, in the case of supplying fuel for regeneration of DPF or CSF to the inside of a cylinder after ignition, fuel is mixed into engine oil by supplying fuel frequently, and engine oil is diluted (Oil Dilution). Generation of Oil Dilution decreases output of an engine, caused by decrease in lubrication function of engine oil, and increase in oil amount in the engine.

Accordingly, it may be considered to decrease number of times of combustion removal of the particulate component deposited onto DPF or CSF, so as not to decrease fuel efficiency as good as possible, while promoting combustion of the particulate component deposited onto DPF or CSF. Decrease in number of times of regeneration is capable of suppressing temperature increase in exhaust gas and decreasing amount of fuel, and thus preventing deterioration of fuel efficiency. However, decrease in number of times of regeneration of DPF or CSF causes deposition of a large quantity of the particulate component onto DPF or CSF, therefore, it becomes necessary to perform oxidation removal of a large quantity of the particulate component at high temperature, in regeneration of DPF or CSF.

In this way, combustion removal of the particulate component by making temperature higher as compared with conventional methods, makes possible to perform combustion removal of a large quantity of the particulate component at one time. However, promotion of heat generation of DOC using a large quantity of the HC components results in exposure of DOC in exhaust gas from a diesel engine at such a high temperature atmosphere as over 800° C., although in a short period of time. In this case, a diesel engine automobile, in many cases, runs a longer distance as compared with a general gasoline engine automobile, therefore repeating regeneration of DPF or CSF for considerable number of times, resulting in exposure at high temperature for a long period of time, which raises a new problem of volatilization of platinum in DOC. Similarly, also in CSF, the catalyst component of CSF is exposed under high temperature atmosphere for a long period of time, which raises a new problem of volatilization of platinum in the catalyst component of CSF, in combustion removal of the particulate component held inside.

Platinum is oxidized at high temperature, volatilizes and adheres to the surface of SCR arranged at the backward of DOC and CSF, thus decreasing reducing performance of the catalyst (NON PATENT LITERATURE 2, NON PATENT LITERATURE 3). And, it is said that influence of the platinum component volatilized in SCR arranged at the backward of such DOC and CSF, is particularly significant in the case of using zeolite as the SCR catalyst.

In the case where activity of the SCR catalyst is lowered caused by the platinum component volatilized in this way, it becomes necessary to increase supply amount of the reducing agent such as urea or the ammonia component. However, supply of a large quantity of urea or the ammonia component could incur slip of ammonia from the SCR catalyst.

Because the noble metal in the catalyst may take various states such as an oxide state, an alloy state, and a composite oxide state with other metals, it is not easy to make clear as to by what reason the noble metal in the catalyst volatilizes, however, as for the platinum component, it can be considered roughly as follows.

Originally, when platinum is in a metal state, because volatilization temperature thereof is as high as 2090° C. (temperature at which vapor pressure becomes $10^{-2}$ Torr) under inert gas atmosphere, it is a metal not to be easily oxidized, even by being processed at high temperature under coexistence with air. However, it has been known that a platinum atom at the metal surface is oxidized when exposed to a high temperature of 850° C. or higher under coexistence with oxygen or air, and converted to a platinum oxide ($PtO_2$) molecule and gradually volatilizes (NON PATENT LITERATURE 5).

In a diesel engine, because fuel is supplied into a cylinder together with a large quantity of air and combusted, a large quantity of oxygen is also included in exhaust gas. In addition, although temperature of exhaust gas of a diesel engine is low, temperature of a catalyst bed of DOC becomes over 700° C. in supplying the HC components to DOC, and there may be the case where it reaches 900° C. sometimes, and thus the platinum component is oxidized and exists in an easy volatilization state.

Further, because the platinum component in the catalyst maintains large surface area by changing to small particle diameter, in order to enhance oxidation activity, the Pt component in DOC is in a state that oxidized components are easily increased, and thus volatilization of the Pt component in the catalyst is worried.

As for suppressing such volatilization of the noble metal component at high temperature, there has already been investigated in TWC (Three Way Catalyst) for purification of HC, CO, and $NO_x$ in exhaust gas discharged from a gasoline engine at the same time (refer to PATENT LITERATURE 7). In this technology, a porous carrier is immersed in a solution of the noble metal to support the catalyst noble metal, and the noble metal supported carrier is immersed in a solution of an organic substance, and then this organic substance supported carrier is heat treated under condition for carbonization of the organic substance to suppress transfer of the Pt component into a vapor phase.

This conventional technology is the one for suppressing transfer of the Pt component into a vapor phase by the following three effects: anchor effect wherein heat treatment is performed under condition where the organic substance in a catalytic raw material is carbonized, and then the carbonized carbon enter into gaps between a porous carrier and the catalytic noble metal, and thus suppress transfer of the catalytic noble metal as a wedge; effect wherein the catalytic noble metal is three-dimensionally immobilized in the porous substance by making pores of the porous carrier shrink by heat treatment at a high temperature of 700° C. or higher; and effect for suppressing transfer of the catalytic noble metal utilizing a base metal such as Fe, Ni, or Co having superior heat resistance, as an obstacle.

However, this conventional technology is extremely difficult to leave carbon components required as ember, in production step of the catalyst, and thus cannot be said practical. In addition, even if the carbon components is left as ember in production, it is easily combusted when contacted with exhaust gas of high temperature in usage of the catalyst, thus maintaining of the effect for a long period of time cannot be expected. In addition, shrinkage of a porous substance by calcining decreases specific surface area (BET value) of the porous carrier, resulting in deterioration of dispersibility of the noble metal component and decrease in activity of the catalyst. In addition, a base metal such as Fe, Ni, or Co is a promoter component, and is not a component to be used necessarily in all catalysts in view of catalyst designing, in particular, Ni and Co are components envisaged to provide health hazard, therefore it is not preferable to use as an automotive catalyst.

In addition, purification of $NO_x$ in TWC is performed by the following steam reforming reaction, using a rhodium (Rh) component in the catalyst and HC in exhaust gas. And, use of a zirconium oxide together with the Rh component promotes the steam reforming reaction (JP-A-2000/027508, page 14).

$$HC + H_2O \longrightarrow COx + H_2 \qquad (7)$$

$$H_2 + NOx \longrightarrow N_2 + H_2O \qquad (8)$$

In $NO_x$ purification in exhaust gas of a gasoline engine in such TWC, and in $NO_x$ purification for processing exhaust gas of a diesel engine with the ammonia component of the reducing agent and the SCR catalyst, reaction steps thereof are basically different. Accordingly, catalyst technology in TWC cannot always be used as it is, as $NO_x$ purification technology for a diesel engine.

In addition, in order to suppress volatilization of the noble metal component from DOC, it may be considered not to use the Pt component as the noble metal component. However, non-use of the Pt component decreases $NO_2$ concentration in exhaust gas, and there may be the case where sufficient reduction purification of $NO_x$ in SCR is not obtained, and decrease in $NO_2$ concentration also deteriorates regeneration efficiency of DPF and CSF.

In addition, as a method for excluding decrease in SCR performance caused by the noble metal component which volatilizes from DOC or CSF, it may be considered to use the SCR catalyst component which has durability against contamination of the noble metal, and is capable of maintaining high $NO_x$ purification performance, for example, a vanadium oxide, as a main component. However, vanadium is a harmful heavy metal, and thus is not desirable in an automotive application.

In SCR, various kinds of zeolite have widely been used, however, zeolite significantly decreases SCR performance caused by contamination with the noble metal.

In this way, it has been desired a practical catalyst apparatus, not incurring decrease in $NO_x$ performance even at high temperature, in the catalyst apparatus arranged with SCR at the backward of DOC or CSF, in exhaust gas flow of a lean burn engine represented by a diesel engine.

CITATION LIST

Patent Literature

PATENT LITERATURE 1: JP-A-05-38420 (Claim 1, paragraphs 0012, 0013, 0014)
PATENT LITERATURE 2: JP-A-08-103636 (Claim 1, paragraphs 0002, 0012)
PATENT LITERATURE 3: JP-A-01-318715
PATENT LITERATURE 4: JP-A-2002-502927 (Claim 1, paragraphs 0007, 0008)
PATENT LITERATURE 5: U.S. Pat. No. 6,823,663
PATENT LITERATURE 6: U.S. Pat. No. 6,928,806
PATENT LITERATURE 7: JP-A-08-38897
PATENT LITERATURE 8: JP-A-09-262467

Non Patent Literature

NON PATENT LITERATURE 1: Catalysis Today 114 (2006) 3-12 (Page 2, left column)
NON PATENT LITERATURE 2: Detection, Origin and Effect of Ultra-Low Platinum Contamination on Diesel-SCR catalyst, SAE Ford Motor Company, Oct. 6, 2008
NON PATENT LITERATURE 3: Impact and Prevention of Platinum Group metals on SCR catalyst Due to DOC Design, SAE Ford Motor Company, Apr. 20, 2009
NON PATENT LITERATURE 4: Influence of Support Materials and Aging on NO Oxidation Performance of Pt Catalysts under an Oxidative Atmosphere at Low Temperature, JOURNAL OF CHEMICAL ENGINEERING OF JAPAN, Vol. 40 (2007) No. 9 pp. 741-748
NON PATENT LITERATURE 5: H. Jehn, High Temperature Behavior of Platinum Group metals in Oxidizing Atmospheres, Journal of the Less Common Metals, 100 (1984), 321-339

SUMMARY OF INVENTION

Technical Problem

In view of the above conventional technical problems, it is an object of the present invention to provide an exhaust gas purification catalyst apparatus using an oxidation catalyst and a selective reduction catalyst which is capable of efficiently purifying, for a long period of time, hydrocarbons, carbon monoxide, nitrogen oxides, and particulate components such as soot included in exhaust gas from a lean burn engine.

Solution to Problem

The present inventors have intensively studied a way to solve the above conventional technical problems and found, as a result, that in an exhaust gas purification apparatus arranged with the SCR catalyst at the backward of DOC, and arranged with the supply means of the $NH_3$ component, as a reducing agent, between DOC and the SCR catalyst, by setting that the noble metal component of DOC contains platinum and palladium, and specifying particle diameter of the noble metal or ratio of Pt particles existing alone, scattering of Pt can be suppressed and $NO_x$ purification performance in the SCR catalyst can be maintained and the reducing component can be utilized effectively, even when catalyst bed temperature becomes in such a significantly high temperature state as 900° C.; and still more found that significant action effect can be obtained similarly also in an exhaust gas purification apparatus additionally arranged with DPF or CSF at the backward of DOC, and arranged with the supply means of the $NH_3$ component, as a reducing agent, before the SCR catalyst, where catalyst bed temperature becomes such a significantly high temperature as 900° C., by setting that the noble metal component of DOC and/or CSF contains Pt and Pd, and specifying particle diameter of the noble metal or ratio of Pt particles existing alone, and have thus completed the present invention.

That is, according to a first aspect of the present invention, there is provided an exhaust gas purification apparatus arranged with an oxidation catalyst (DOC) including a noble metal component for oxidizing nitrogen oxides (NO) in an exhaust gas discharged from a diesel engine, a reducing agent spraying means for supplying the reducing agent selected from a urea component or an ammonia component, and a selective reduction catalyst (SCR) not including a noble metal for removing by reduction nitrogen oxides ($NO_x$) by contacting with the reducing agent, in this order from the upstream side of an exhaust gas passage, characterized in that activity of the selective reduction catalyst (SCR) is maintained by setting that the noble metal component of the oxidation catalyst (DOC) comprises platinum and palladium, and ratio of platinum particles existing alone is 20% or less, or average particle diameter of the noble metal is 4 nm or larger, and by suppressing volatilization of platinum from the oxidation catalyst (DOC), even when catalyst bed temperature increases up to 900° C.

In addition, according to a second aspect of the present invention, in the first aspect, there is provided the exhaust gas purification apparatus according to the claim 1, characterized by further arranging a combustion filter (DPF) not including the noble metal component for capturing particulate components (PM) in exhaust gas, and removing them by combustion (oxidation), downstream of the oxidation catalyst (DOC), and upstream of the reducing agent spraying means.

In addition, according to a third aspect of the present invention, in the first aspect, there is provided the exhaust gas purification apparatus, characterized in that the selective reduction catalyst (SCR) is a selective reduction catalyzed combustion filter (SCRF) where the selective reduction catalyst (SCR) is coated on the combustion filter (DPF) not including the noble metal component, for capturing particulate components (PM) in exhaust gas, and removing them by combustion (oxidation).

In addition, according to a fourth aspect of the present invention, in the first aspect, there is provided the exhaust gas purification apparatus, characterized by further arranging a catalyzed combustion filter (CSF) including the noble metal component for removing by combustion (oxidation), at the backward of the oxidation catalyst (DOC) and at the forward of the reducing agent spraying means, and characterized in that activity of the selective reduction catalyst (SCR) is maintained by setting that the noble metal component of the catalyzed combustion filter (CSF) comprises platinum and palladium, and ratio of platinum particles existing alone is 3% or less, and suppressing volatilization of platinum from the catalyzed combustion filter (CSF), even when catalyst bed temperature increases up to 900° C.

In addition, according to a fifth aspect of the present invention, in any of the first to the fourth aspects, there is provided the exhaust gas purification apparatus characterized in that the component of selective reduction catalyst (SCR) does not comprise the noble metal component, but comprises zeolite or crystalline metal aluminophosphate.

In addition, according to a sixth aspect of the present invention, in any of the first to the fourth aspects, there is provided the exhaust gas purification apparatus characterized in that the oxidation catalyst (DOC) has a supported amount of the noble metal of 0.5 to 4.0 g/L in metal equivalent.

In addition, according to a seventh aspect of the present invention, in any of the first to the fourth aspects, there is provided the exhaust gas purification apparatus characterized in that the oxidation catalyst (DOC) has a ratio of platinum and palladium of 1:1 to 11:2, in weight equivalent.

In addition, according to an eighth aspect of the present invention, in any of the first to the fourth aspects, there is provided the exhaust gas purification apparatus, characterized in that the oxidation catalyst (DOC) has a coated amount of an oxidizing component, which composes a catalyst layer, of 100 to 300 g/L.

In addition, according to a ninth aspect of the present invention, in any of the first to the fourth aspects, there is provided the exhaust gas purification apparatus characterized in that an amount of platinum which volatilizes from the oxidation catalyst (DOC) and adheres to the selective reduction catalyst (SCR) is 12 ppm or less, after 20 hours have passed.

In addition, according to a tenth aspect of the present invention, in the fourth aspect, there is provided the exhaust gas purification apparatus characterized in that the catalyzed combustion filter (CSF) has a supported amount of the noble metal of 0.1 to 2.0 g/L in metal equivalent.

In addition, according to an eleventh aspect of the present invention, in the fourth aspect, there is provided the exhaust gas purification apparatus, characterized in that the catalyzed combustion filter (CSF) has a ratio of platinum and palladium of 1:1 to 11:4, in weight equivalent.

In addition, according to a twelfth aspect of the present invention, in the fourth aspect, there is provided the exhaust gas purification apparatus characterized in that the catalyzed combustion filter (CSF) has a coated amount of an oxidizing component, which composes a catalyst layer, of 5 to 150 g/L.

In addition, according to a thirteenth aspect of the present invention, in the fourth aspect, there is provided the exhaust gas purification apparatus characterized in that an amount of platinum which volatilizes from the catalyzed combustion filter (CSF) and adheres to the selective reduction catalyst (SCR) is 12 ppm or less, after 20 hours have passed.

In addition, according to a fourteenth aspect of the present invention, in any of the first to the fourth aspects, there is provided the exhaust gas purification apparatus characterized in that the noble metal component is supported on a substrate having an integral-type structure.

In addition, according to a fifteenth aspect of the present invention, in the fourteenth aspect, there is provided the exhaust gas purification apparatus characterized in that the substrate having an integral-type structure is a flow-through-type honeycomb structure and/or a wall-flow-type honeycomb structure.

In addition, according to a sixteenth aspect of the present invention, in any of the first to the fourth aspects, there is provided the exhaust gas purification apparatus characterized in that an ammonia oxidation catalyst (AMOX) is still more arranged after the selective reduction catalyst (SCR).

Advantageous Effects of Invention

According to the present invention, in an exhaust gas purification apparatus arranged with the oxidation catalyst (DOC) in a passage of exhaust gas from a diesel engine, and arranged with the selective reduction catalyst (SCR) at the backward of DOC, because the noble metal component of DOC contains Pt and Pd, and specifies particle diameter of the noble metal or ratio of Pt particles existing alone, scattering of Pt can be suppressed and $NO_x$ purification performance in the SCR catalyst can be maintained and the reducing component can be utilized effectively, even when catalyst bed temperature of DOC is in such a significantly high temperature state as 900° C.

Still more, in an exhaust gas purification apparatus additionally arranged with a filter (DPF or CSF) after DOC, and arranged with the supply means of the $NH_3$ component, as a reducing agent, before the DOC and the SCR catalyst, where catalyst bed temperature of the filter (DPF or CSF) becomes such a significantly high temperature as 900° C., also $NO_x$ purification performance in the SCR catalyst can be maintained, and the reducing component becomes utilizable effectively by setting that the noble metal component of DOC and/or CSF contains Pt and Pd, and specifying particle diameter of the noble metal or ratio of Pt particles existing alone.

In addition, because denitration can be performed stably in SCR, even under extremely high temperature condition of a catalyst bed of a filter (DPF or CSF), the filter can be regenerated using small amount of fuel, by combusting at one time by deposition of a large quantity of the particulate components onto the filter (DPF or CSF), and thus enhancement of fuel efficiency in a diesel engine can be attained.

DESCRIPTION OF EMBODIMENTS

Description will be given below in detail mainly on the case of applying the present invention to a diesel automobile application, however, it is not without saying that the present invention is also effective to a diesel engine to be used in various power sources such as power generation.

1. [The Exhaust Gas Purification Catalyst Apparatus (DOC+ SCR)]

Figure 1:
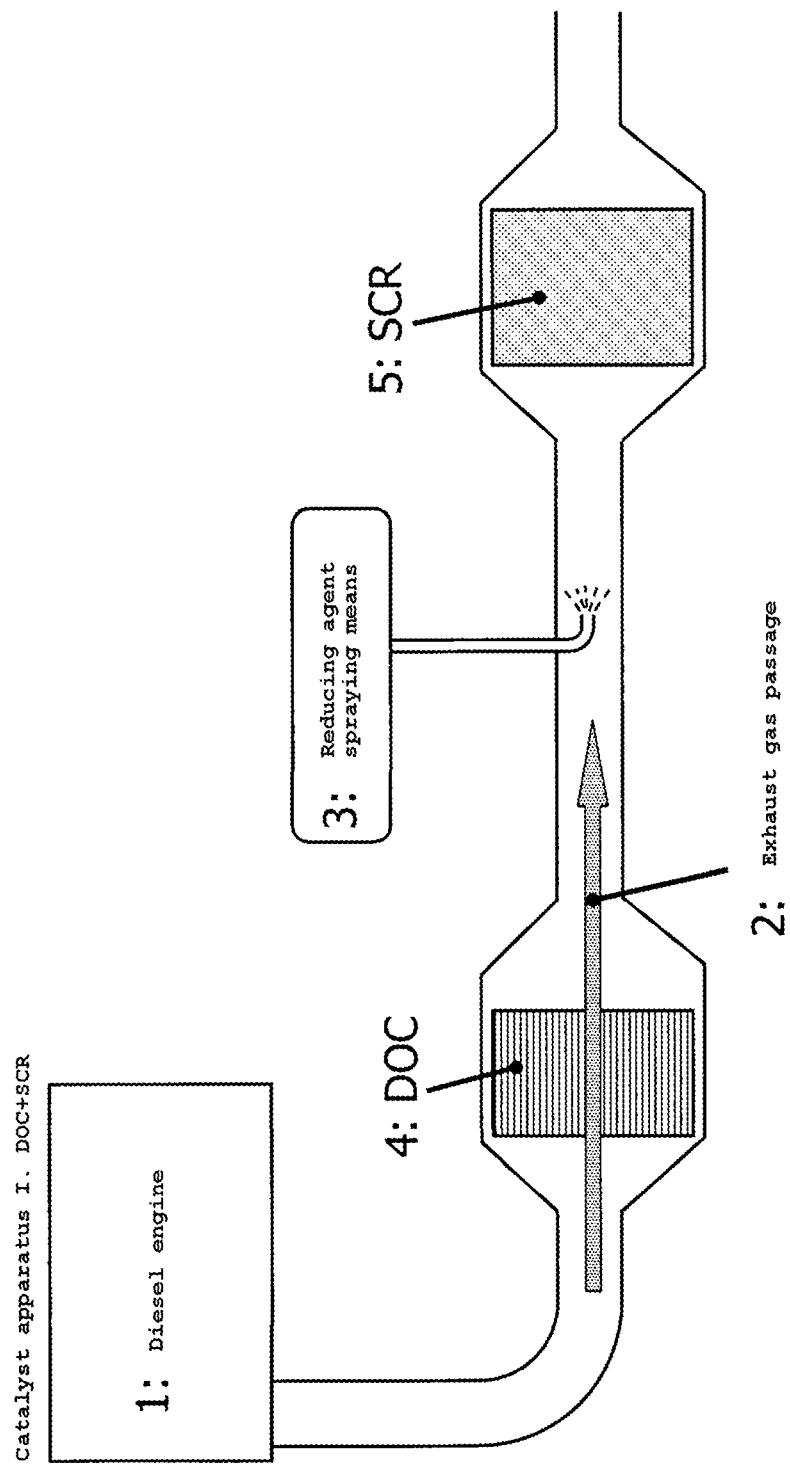
FIG. 1 is an explanation drawing showing schematically a configuration, where an oxidation catalyst (DOC), a reducing component supplying means, and a selective reduction catalyst (SCR) are arranged in this order, in an exhaust gas purification apparatus of the present invention.

The exhaust gas purification catalyst apparatus of the present invention has DOC, SCR and a supply means of a reducing agent as essential configuration elements. The present invention is, as shown in FIG. 1, an exhaust gas purification catalyst apparatus set with a reducing agent supply means 3 at the backward of a oxidation catalyst (DOC) 4, and arranged with a selective reduction catalyst (SCR) 5 at the backward of this spraying means 3 in exhaust gas passage 2 from a diesel engine 1, (hereafter may be referred to simply as a catalyst apparatus I).

That is, the catalyst apparatus I of the present invention aims at suppressing slip of the platinum component from DOC to SCR, and preventing performance decrease of an $NO_x$ reducing catalyst using a urea aqueous solution or an ammonia aqueous solution (hereafter may also be referred to as an ammonia component or a $NH_3$ component) in SCR arranged at the backward of DOC, even in the case where DOC is exposed at high temperature in exhaust gas flow, by specifying ratio of Pt particles existing alone or particle diameter of the noble metal.

1. [DOC: The Oxidation Catalyst]

DOC to be used in the present invention is an oxidation catalyst including a noble metal component for oxidizing HC or CO in exhaust gas, and contains at least a platinum component and a palladium component as the noble metal component.

(The Noble Metal Component)

In the oxidation catalyst, as described above, the platinum component is generally used as the noble metal component, and the palladium component may also be used in some cases. Use of only Pd in this case becomes possible to eliminate volatilization of Pt from DOC. However, only by the Pd component, it is difficult to obtain sufficient NO oxidation activity.

In addition, it is predicted that the noble metal component in the catalyst becomes oxidized at the surface with time passage in exhaust gas at high temperature. A Pd oxide has high melting point and less volatilizes as compared with a Pt oxide. Because the Pd component difficult to volatilize has adsorption action of the Pt component volatilized, or suppressing action of volatilization of Pt by making an alloy of the Pt component and the Pd component, it is designed for DOC to include the Pd component together with the Pt component as essential components, in the exhaust gas purification catalyst apparatus of the present invention. The addition of the Pd component also leads to decrease use amount of the expensive Pt component.

Amount of the Pt component in the noble metal component is preferably 50% by weight or higher, and more preferably 60% by weight or higher, in metal equivalent. The too low amount of the Pt component may provide the case of insufficient NO oxidation performance and heat generation capability of exhaust gas, while the too much amount of the Pt component increases volatilization amount of the Pt component, and could make transfer amount of Pt to the SCR catalyst not including the noble metal component, over allowable amount.

Such a noble metal component is supported on an inorganic oxide (base material), and mixed with other catalyst components as needed, and coated on a structure-type substrate as a catalyst composition. As the inorganic oxide as a base material for supporting the noble metal component in this way, a catalyst material known in the field of the exhaust gas purification catalyst can be used. As such an inorganic material, a porous inorganic oxide, which has high heat resistance and is capable of stably and highly dispersing the noble metal component, due to having large specific surface area, is preferable.

As the porous inorganic oxide, it can be selected as appropriate from known inorganic oxides. Specifically, various kinds of alumina, zirconia, ceria, silica, silica-alumina, titania, zeolite and the like can be used. These main components may be used alone or by mixing two or more kinds, or as a composite oxide of two or more kinds. In addition, the base material to be used alone, by mixing, or as the composite oxide in this way may be a pure metal oxide, however, other elements may be added to adjust heat resistance or catalytic activity. As these additives, various kinds of rare earth metal components, various kinds of transition metal components are included, and each may be added alone or two or more kinds of components may be added in combination.

Among these inorganic oxides, alumina is preferable in the present invention. As alumina, there are included γ-alumina, β-alumina, δ-alumina, η-alumina, and θ-alumina, and among them, γ-alumina is preferable. And, as for γ-alumina, in particular, γ-alumina added with lanthanum is preferable. γ-alumina added with lanthanum is superior in heat resistance, and in the case where the noble metal component such as the platinum component or the palladium component is supported, maintaining of high catalytic activity is possible even at high temperature (JP-A-2004-290827). Specific surface area (by BET value, the same hereafter) of γ-alumina, or γ-alumina added with lanthanum is preferably 80 to 250 m²/g, and still more preferably 200 to 250 m²/g. The specific surface area of γ-alumina of 250 m²/g or lower provides good heat resistance of the catalyst and enables to stabilize a dispersion state of the noble metal component, while 80 m²/g or higher enables to attain high dispersion of the noble metal component.

The major problem of the present invention is to maintain denitration performance of the selective reduction catalyst (SCR) at the latter part, by preventing volatilization of platinum supported on the above inorganic oxide (inorganic base material), even when exposed at high temperature under air atmosphere containing steam for a long period of time.

Fundamentally, in the oxidation catalyst (DOC), the noble metal component such as platinum supported on the inorganic oxide is contrived to disperse as highly as possible to increase number of active sites for performing a reaction between $NO_x$ and oxygen ($O_2$), so as to enhance oxidation activity of $NO_x$, and accordingly, it is required to make particle diameter of the noble metal such as platinum smaller, which leads to higher specific surface area of the total noble metal, increase in number of a platinum atom to be contacted with oxygen ($O_2$), and increase in amount of platinum to be oxidized.

As a means for suppressing scattering of platinum, there has been composite making with palladium, which is more difficult to volatilize as compared with platinum in an oxide state (JP-A-2003-299957, WO99/32223), or a method for decreasing specific surface area by increasing the size of the platinum particle itself (PATENT LITERATURE 8: JP-A-9-262467).

However, in composite making with palladium, provided that durability condition is 5 hours at 1000° C., ratio of palladium is higher, such as ratio of platinum and palladium is 1:1 to 1:15 (JP-A-2003-299957), and thus platinum superior in oxidation activity of $NO_x$ cannot be utilized effectively. In addition, in the case where ratio of platinum is higher, such as ratio of platinum and palladium is 9:1, there is far discrepancy between durability condition of 10 hours at 800° C., and practically required durability condition of 20 hours at 900° C. (WO99/32223).

On the other hand, in PATENT LITERATURE 8, although average particle diameter of platinum is set at 5 to 40 nm, durability condition is set at 3.5 hours at 810° C., there is far discrepancy from practically required durability condition (20 hours at 900° C.), and therefore practicality is questionable. Still more, because of setting average particle diameter of platinum at 5 to 40 nm, it requires treatment of platinum-supported γ-alumina, in a frequency of 20 minutes, at 700° C. for 5 hours, using 10% $O_2/N_2$ gas and 20% ($CO:H_2$=75%: 25%)/$N_2$ gas, which hikes cost for production facilities, safety measures, and for maintaining a furnace at high temperature, which provides a problem in view of resource saving, energy saving and price. Any of these cases not only does not satisfy durability requirement (900° C., 20 hours) nor oxidation performance of NO (a mixing ratio of platinum of 50% by weight or higher) but also hikes production cost.

On the other hand, the present invention is characterized in that the noble metal component of the oxidation catalyst (DOC) contains platinum and palladium, and ratio of platinum particles existing alone is 20% or less, or average particle diameter of the noble metal is 4 nm or larger, and in this way, suppresses volatilization of platinum, and maintains activity of the selective reduction-type catalyst (SCR), even when catalyst bed temperature of the oxidation catalyst (DOC) increases up to 900° C.

In order to support platinum of a noble metal onto the above inorganic base material by making composite with palladium, as a starting salt of platinum, an ethanolamine solution of hexahydroxoplatinic(IV) acid, tetraammineplatinum(II) acetate, tetraammineplatinum(II) carbonate, tetraammineplatinum(II) nitrate, a nitric acid solution of hexahydroxoplatinic (IV) acid, platinum nitrate, diamminedinitroplatinum nitrate, hexachloroplatinic(IV) acid or the like can be used, and as a starting salt of palladium, tetraamminepalladium(II) acetate, tetraamminepalladium(II) carbonate, tetraamminepalladium(II) nitrate, diamminedinitropalladium, palladium nitrate, palladium chloride or the like can be used. The preferable one as the starting salt of platinum is the ethanolamine solution of hexahydroxoplatinic(IV) acid, platinum nitrate, diammine dinitroplatinum nitrate, tetraammineplatinum (II) nitrate, or the like, and the one where components other the noble metal easily volatilizes by heat treatment in catalyst preparation is preferable.

It should be noted that the case of using a chloride as the starting salt could give adverse influence on catalytic activity due to remaining of chlorine, depending on a production method.

After mixing an aqueous solution of such a metal salt and the inorganic base material, drying and calcining thereof can be performed by a known method, as appropriate.

In mixing, in order to suppress ratio of the platinum particle existing alone within a range of the relevant invention, it is necessary to match property (acidity, alkalinity) of aqueous solution of each starting salt of platinum and palladium. For example, there is included a combination of tetraammineplatinum (II) acetate-tetraamminepalladium(II) acetate (both are alkaline); an ethanolamine solution of hexahydroxoplatinic(IV) acid-tetraamminepalladium(II) acetate (the same as above); platinum nitrate-palladium nitrate (both are acidic); diamminedinitroplatinum nitrate-palladium nitrate (the same as above); hexachloroplatinic (IV) acid-palladium chloride (the same as above) or the like.

By making property of the aqueous solutions of each of the starting salts of platinum and palladium the same, a uniform solution state can be maintained as it is, without generation of a precipitate even in mixing both aqueous solutions, therefore the platinum particle and the palladium particle are present each in a mixed state, and it is difficult for each to be existing alone, even after making supported onto the inorganic base material.

However, the too large ratio of platinum and palladium tends to make platinum exist alone. In addition, in the case where properties of each starting salts of platinum and palladium are different (acidity and alkalinity), the precipitate is generated by mixing both of the aqueous solutions, therefore, in the case where each can be supported only alone onto the inorganic base material, ratio of presence of the platinum particle and the palladium particle each alone becomes high.

Even in such a case, by making particle diameter of the noble metal particle large, and making specific surface area of the noble metal particle small, volatilization speed of platinum from the noble metal surface can be suppressed.

As a method for increasing the size of the noble metal particle supported on the inorganic material, without making oxidized, there has been known a treatment method at high temperature, generally in inert gas (nitrogen, argon or the like), or a method for repeating oxidation-reduction at high temperature, as described above (JP-A-9-262467). However, this method requires facilities for sealing gas, along with inert gas, oxidizing gas and reducing gas, and thus is not preferable in view of resource saving and energy saving.

Accordingly, in the present invention, it is preferable to increase particle diameter of the noble metal component such as platinum, by adding a combustible substance in producing slurry by adding a catalyst component in advance, and after coating the slurry onto a substrate having an integral structure, by sintering the catalyst components onto the carrier in calcining, as well as generating heat in burning the combustible substance, and generating high temperature.

In this case, because combustion (oxidation) of the combustible substance at the neighborhood of catalyst surface consumes oxygen in air, catalyst surface is possible to become a reduced state, use of the combustible substance makes the noble metal such as platinum in a reducing atmosphere at high temperature, which gives expectation of particle growth, while the noble metal such as platinum or the like maintains a metal state.

As the combustible substance, an inexpensive material including carbon is preferable, and includes, for example, in addition to refined sugar, monosaccharides such as fructose, glucose, and brain sugar; disaccharides such as sucrose, maltose, and lactose.

These are safe as materials and superior in solubility, and not only sufficiently combust under condition in calcining by coating the catalyst component onto the honeycomb structure such as at an ignition temperature of 350° C., but also have characteristics of providing complete combustion and little remaining residue such as soot, because of having less carbon atoms of 6 to 12 for making a molecule, and thus are suitable as the combustible substance.

[A Substrate Having an Integral-Type Structure]

As DOC of the present invention, in order to support the noble metal component in a good dispersion state, the substrate having an integral-type structure, that is, the honeycomb structure (hereafter may also be referred to as a honeycomb substrate) is used. The honeycomb structure is a structure with a honeycomb shape where many through holes are concentrated. As a material of such a honeycomb structure, stainless steel, silica, alumina, silicon carbide, cordierite or the like may be used, however, in the present invention, the honeycomb structure made of any of these materials can be used.

As such a honeycomb structure, it is desirable to use a flow-through-type honeycomb structure having through holes, opened at both ends, integrated in a honeycomb shape, in applications not only for DOC but also SCR to be described later. On the other hand, in DPF, CSF, and SCRF to be described later, it is desirable to use a wall-flow-type honeycomb structure having through holes integrated in a honeycomb shape, which is open at one of the opening part of the through hole and is closed at the other end. In such a honeycomb structure-type catalyst, a catalyst composition dedicated for each honeycomb structure-type catalyst may be coated on one honeycomb structure.

Such a honeycomb substrate is selectable from known honeycomb structure-type substrates, and whole shape thereof is arbitrary and may be selected as appropriate from column-type, square pole-type, hexagonal cylinder-type or the like, in response to a structure of an exhaust system to be applied. Further, as for pore number of the opening part, a suitable pore number may be determined in consideration of kind of exhaust gas to be treated, gas flow rate, pressure drop or removal efficiency or the like, however, usually about 100 to 1500 pieces per one square inch (6.45 cm$^2$) is preferable, and 100 to 900 pieces is more preferable for application of exhaust gas purification of a diesel automobile. The cell density per one square inch (6.45 cm$^2$) of 10 pieces or more is capable of securing contact area between exhaust gas and the catalyst, and provides sufficient exhaust gas purification function, while the cell density per one square inch (6.45 cm$^2$) of 1500 pieces or less does not lead to significant pressure drop of exhaust gas, and does not impair performance of an internal combustion engine.

In addition, thickness of the cell wall of the honeycomb carrier is preferably 2 to 12 mil (milli inch) (0.05 to 0.3 mm), and more preferably 3 to 8 mil (0.076 to 0.2 mm).

In order to prepare a catalyst such as DOC from the honeycomb carrier to be used in the present invention, a washcoat method is generally used.

In the present invention, in order to prepare the oxidation catalyst (DOC) by a washcoat method, firstly the catalyst material and the honeycomb substrate are provided. The catalyst material is prepared, together with additives such as a binder or a surfactant, as needed, by mixing with water or a solvent, where a water-soluble organic solvent is added to water, to make a slurry-like mixture, and by coating it onto the honeycomb substrate, and then by drying and calcining. That is, the catalyst material is mixed with water or a solvent, where a water-soluble organic solvent is added to water, in specified ratio, to obtain the slurry-like mixture. In the present invention, the aqueous medium may be enough to be used in amount which is capable of dispersing each catalyst component uniformly in the slurry. It should be noted that water or a solvent, where a water-soluble organic solvent is added to water, is referred to hereafter as "aqueous medium".

The catalyst material includes the noble metal component including at least platinum, as the inorganic base material. The noble metal component may be supported, in advance, onto the inorganic base material. The metal catalyst component and the inorganic base material are mixed in the aqueous medium, in advance, to prepare the slurry.

In preparing the catalyst material, in the case where the noble metal is supported, in advance, on the base material, a known method may be adopted, as appropriate, and one example thereof is shown below as follows.

Firstly, as a raw material of the noble metal component, a compound such as a nitrate, a carbonate, an acetate, a chloride, specifically, an ethanolamine solution of hexahydroxoplatinic (IV) acid, tetraammineplatinum(II) acetate, tetraammineplatinum (II) carbonate, tetraammineplatinum (II) nitrate, a nitric acid solution of hexahydroxoplatinic (IV) acid, platinum nitrate, diamminedinitroplatinum nitrate, hexachloroplatinic (IV) acid or the like, and as a starting salt of palladium, tetraamminepalladium(II) acetate, tetraamminepalladium(II) carbonate, tetraamminepalladium(II) nitrate, diamminedinitropalladium, palladium nitrate, palladium chloride or the like is prepared. By selecting any one from them and dissolving it in an organic solvent, a solution of the noble metal component is provided.

Then, the solution of this noble metal component is mixed with the inorganic base material, together with the aqueous medium, then it is dried at 50 to 200° C. to remove the solvent, and then it is calcined at 300 to 1200° C. It should be noted that other than the above components, known catalyst materials may be blended, as a binder and the like. As such a known catalyst materials, there are included alumina, silica, titania, zirconia, silica-alumina, ceria, an alkali metal material, an alkaline earth metal material, a transition metal material, a rare earth metal material, silver, a silver salt and the like, and a dispersing agent, and a pH adjuster can be used in combination, as needed.

In order to cover the catalyst composition onto the honeycomb substrate, the catalyst composition is coated as the slurry-like mixture. The catalyst composition may be coated as one layer, or so as to become two or more layers. After coating the catalyst composition, drying and calcining are performed. It should be noted that drying temperature is preferably 100 to 300° C., and more preferably 100 to 200° C. In addition, calcining temperature is preferably 300 to 700° C., and particularly preferably 400 to 600° C. Drying time is preferably 0.5 to 2 hours and calcining time is preferably 1 to 3 hours. Heating may be performed using a known heating means such as an electric furnace, or a gas furnace.

(Function of DOC)

In the exhaust gas purification catalyst apparatus of the present invention, DOC including the Pt component as an essential component is used. Major component of NO included in exhaust gas from an engine is NO. In a conventional exhaust gas purification catalyst apparatus, it has been said desirable that NO and $NO_2$ are set in suitable ratio to promote NO purification in the SCR catalyst. This $NO:NO_2$ ratio is set at about 1:1, in the SCR catalyst having zeolite such as Fe-β or MFI, as a major component.

Also in the exhaust gas purification apparatus of the present invention, DOC is arranged at the forward of the SCR catalyst to oxidize NO to $NO_2$, and increase $NO_2$ concentration in $NO_x$. As for such NO oxidation performance, the noble metal component has higher performance as compared with a transition metal, and the Pt component is superior to the Pd component (JP-A-2009-167844: paragraph [0021], JP-A-2008-526509: paragraph [0005], JP-A-2008-155204: paragraph [0006], NON PATENT LITERATURE 4 (JOURNAL OF CHEMICAL ENGINEERING OF JAPAN, Vol. 40 (2007) No. 9 pp. 741-748, or the like)).

The Pd component tends to be easily poisoned by a sulfur component in light oil or heavy oil, which is fuel of a diesel engine, and may be deactivated during use for a long period of time. Accordingly, in the present invention, in using the Pd component in DOC, it is preferable that mixing ratio thereof is set at 50% by weight or lower.

In the present invention, supporting amount of the noble metal component of DOC is preferably 0.5 to 4.0 g/L, and more preferably 0.8 to 3.0 g/L, in metal equivalent, per unit volume of the integral structure-type substrate. The too low amount of the noble metal component does not provide sufficient NO oxidation performance, whereas the too high amount of the noble metal component not only does not provide enhancement of NO oxidation performance comparable to use amount but also increases volatilization amount of the Pt component, which could make Pt amount transferring to the SCR catalyst over allowable amount.

In addition, ratio of platinum and palladium in the noble metal component of DOC is preferably 1:1 to 11:2, in weight equivalent and more preferably 3:2 to 11:2. The ratio below 1:1 increases decrease in oxidation activity of HC, CO, NO or the like accompanied with decrease in content of platinum, while the ratio over 11:2 increases decrease in denitration performance of SCR caused by the noble metal such as platinum volatilized, even under coexistence with palladium, and thus is not preferable.

Still more, in the present invention, coated amount of an oxidizing component, which composes a catalyst layer of the oxidation catalyst (DOC), is preferably 100 to 300 g/L, and more preferably 150 to 250 g/L. The coating amount of the oxidizing component below 100 g/L decreases oxidation activity caused by deterioration of dispersibility of the noble metal such as platinum to be supported, while the ratio over 300 g/L increases pressure drop caused by narrowing of the inside of the cell, and thus is not preferable.

2. [SCR Catalyst: Selective Reduction Catalyst]

The SCR catalyst to be used in the exhaust gas purification apparatus of the present invention is the one for purifying by reduction $NO_x$ in exhaust gas using the ammonia component as the reducing agent. The SCR catalyst material includes, other than zeolite or a zeolite-like compound (crystal metal aluminophosphate) to be described later, various inorganic materials of a transition metal oxide such as vanadium oxide, titania, zirconia, or tungsten oxide; a rare earth oxide such as ceria, lanthanum oxide, praseodymium oxide, samarium oxide, gadolinium oxide, or neodymium oxide; a base metal oxide such as gallium oxide or tin oxide; or a composite oxide thereof, and the like. In addition, alumina or silica, and a mixture or a composite of alumina or silica modified with a rare earth, an alkali metal, an alkaline earth group and the like, with the above oxide, and the like are also included. However, it is desirable in an automotive application not to include a harmful heavy metal such as vanadium.

In the present invention, it is preferable that the SCR catalyst includes zeolite or crystal metal aluminophosphate. In addition, in the present invention, it is preferable that the noble metal component such as Pt or Pd is not included, because of generating $NO_x$ by oxidation of the ammonia component.

Zeolite is a generic name of an aluminosilicate having micropores in a crystal, and is capable of selectively taking in a molecule inside the pore thereof, and promoting a reaction. Such a zeolite material or the above inorganic material has superior $NO_x$ reduction purification performance as an SCR material, however, it significantly decreases NO reduction purification performance when contaminated with a noble metal. On the other hand, according to the present invention, because Pt, which is the noble metal component in DOC, is supported on a honeycomb structure in a state difficult to be scattered even when exposed at high temperature, contamination of zeolite or the above inorganic material can be prevented, and superior NO reduction purification performance as the SCR catalyst can be exerted stably for a long period of time.

The SCR catalyst is preferably an integral structure-type substrate, such as a flow-through-type honeycomb structure or a wall-flow-type honeycomb structure.

(Zeolite and the Zeolite-Like Compound)

In the present invention, zeolite is not especially limited, however, it may be selected as appropriate from a Y-type, β-type, MFI-type, CHA-type, USY-type, SUZ-type, MCM-type, PSH-type, SSZ-type, ERB-type, ITQ-type, mordenite, and ferrierite. In addition, it is included a crystal metal aluminophosphate, having a similar layer-like structure as zeolite (JP-A-60-86011). As such a crystal metal aluminophosphate, there has been known a crystalline aluminophosphate (ALPO) or a crystalline silicoaluminophosphate (SAPO), and they have been investigated as the SCR catalyst materials (US 2008/0241060). Such zeolite and the zeolite-like compound may be used alone or two or more kinds of the materials by mixing, or multiple materials may be coated in multilayer on the surface of the structure-type substrate. In addition, zeolite and the zeolite-like compound may be the ion exchanged one at the cation site thereof with a transition metal component such as iron, copper, or a rare earth such as cerium or lanthanum.

Among such zeolite and the zeolite-like compound, use of β-type zeolite is preferable in the present invention, as the SCR catalyst material. β-type zeolite has a relatively complex 3D pore structure consisting of linear pore having relatively large diameter and aligned in one direction, and a curved pore crossing with them, and provides easy diffusion of a cation in ion exchange and easy diffusion of a gas molecule such as $NH_3$, as well as has property superior in reactivity and durability.

In addition, zeolite has an acid site which is capable of adsorbing a basic compound such as $NH_3$, and number of the acid site differs depending on Si/Al ratio thereof. Generally, zeolite having low Si/Al ratio has more number of the acid site, and has larger degree of degradation in durability under co-presence of steam, while on the contrary, zeolite having high Si/Al ratio is superior in heat resistance but has less acid site. In the $NH_3$ selective reduction catalyst, because $NH_3$ adsorbs at the acid site of zeolite, which becomes an active site to reduce and remove nitrogen oxides such as $NO_2$, the one having more acid sites (the one having lower Si/Al ratio) is advantageous for the denitration reaction. In this way, as for the Si/Al ratio, durability and activity are in a trade off relation, and in consideration of this, the Si/Al ratio of zeolite is preferably 5 to 500, more preferably 10 to 100, and still more preferably 15 to 50. Both the β-type zeolite and the MFI-type zeolite suitable for the SCR catalyst similarly have such characteristics.

(β-Type Zeolite)

It is preferable that, as the SCR catalyst material in the present invention, β-type zeolite, which is ion exchanged with an iron element at a cation site of zeolite, is used. In addition, this zeolite, which is ion exchanged with an iron element at a cation site of zeolite, may include an iron oxide as the iron component. In this way, because zeolite including the iron element has high adsorption-desorption rate of $NH_3$, and also high activity as SCR, it is preferable to be included as a main component. Here the main component means that it is 50% by weight or more in total zeolite amount to be used in the catalyst composition to be covered on a substrate of the SCR catalyst.

β-Type zeolite has a 3D pore structure as described above, and provides easy diffusion of cation in ion exchange and diffusion of a gas molecule such as $NH_3$. In addition, because such a structure is a unique structure and a complicated pore structure, as compared with mordenite, faujasite or the like having only linear pore aligned in one direction, β-type zeolite is an effective material for an automotive catalyst, due to little arising structural collapse caused by heat, and having high stability.

(β-Type Zeolite Added with the Iron Element)

Generally, in zeolite, as a solid acid site, a cation is present as a counter ion. As the cation, an ammonium ion or a proton is general, however, the β-type zeolite added with an iron element as the cation species is preferable (hereafter, it may be referred to as "Fe-β" in some cases).

It is preferable that ratio for p-type zeolite to be ion exchanged with the iron element is expressed by the following equation (9), based on the fact that one iron element (ion) and two $[AlO_{4/2}]$ units, which is a monovalent ion exchange site in zeolite, form an ion pair.

[Mole number of the iron element included by ion exchange in unit weight of zeolite/{(mole number of $Al_2O_3$ present in unit weight of zeolite)× (½)}]×100     (9)

Ion exchange ratio is preferably 10 to 100%, more preferably 12 to 92%, and still more preferably 30 to 70%. The ion exchange ratio of 92% or lower further stabilizes a skeleton structure of zeolite, enhances heat resistance of a catalyst and hence lifetime of the catalyst, and is capable of providing more stabilized catalytic activity. However, the too low ion exchange ratio below 10% may not provide sufficient denitration performance in some cases. It should be noted that in the case where the above-described ion exchange ratio is 100%, it means that all of the cation species in zeolite is ion exchanged with the iron element. In this way, ion exchanged zeolite exerts superior purification capability.

(Various Kinds of Inorganic Materials)

In the present invention, the inorganic material may be selected as appropriate from a transition metal oxide such as titania, zirconia, or tungsten oxide; a rare earth oxide such as ceria, lanthanum oxide, praseodymium oxide, samarium oxide, gadolinium oxide, or neodymium oxide; a base metal oxide such as gallium oxide or tin oxide; or a composite oxide thereof, or the like. In addition to the above, because alumina or silica, and alumina or silica modified with a rare earth, an alkali metal, an alkaline earth group or the like, are superior in heat resistance and has larger specific surface area as compared with the above oxide, by mixing or making composite with the above oxide, specific surface area of the above oxide itself can be increased, and thus is more preferable.

Among them, ceria has been known as an $NO_x$ adsorption function material, and also in the present invention, by promoting adsorption of $NO_x$, it has function enabling to promote the SCR reaction between $NH_3$ and $NO_x$. In addition, zirconia can be expected to have effect as a dispersion maintaining material for dispersing other components in a thermally stable state. Additionally, a tungsten oxide has strong acidity and has strong adsorption force of urea or ammonia, which is the reducing agent, therefore, use of the tungsten oxide can be expected to have effect of enhancing denitration performance, therefore it is preferable to use these oxides alone or by mixing or composite making.

These oxides and composite oxides thereof are not especially limited, as for a composition, a structure and a preparation thereof. For example, there may be adopted a method for calcining a solid material obtained by dissolving a starting raw material having a form of a nitrate, a sulfate, a carbonate, an acetate, a chloride or the like, including the above element, into an aqueous solution, then mixing and precipitating as a precipitate, by pH adjustment or the like, or by evaporation to dryness; a method for performing the above treatment by solubilizing these multiple metal salts all at once, in mixing and making composite; or a method for performing the above treatment for single or multiple metal salts to form an oxide, and then supporting residual metal salts all at once or sequentially.

(Relation Between DOC and the SCR Catalyst)

Zeolite or the above inorganic material exerts superior $NO_x$ reduction purification performance, however, as described above, it may sometimes significantly decrease activity when contaminated with the noble metal component such as Pt. However, by suppressing scattering of Pt from DOC, as in the present invention, contamination of the SCRF catalyst by Pt can be prevented, and $NO_x$ reduction purification performance at the SCR catalyst can be enhanced by utilization of $NO_2$ generated by DOC.

In addition, presence or absence of the noble metal is not especially limited as for the catalyst to be arranged at the backward of SCR, and a catalyst including the noble metal component may be arranged. On the above, description was made on relation between DOC and the SCR catalyst, however, it can be considered similarly when DPF or CSF is arranged between DOC and SCR.

In the present invention, when catalyst bed temperature of the oxidation catalyst (DOC) increased up to 900° C., an amount of platinum which volatilizes from the oxidation catalyst (DOC) and adheres to the selective reduction catalyst (SCR) is preferably 12 ppm or less, after 20 hours have passed, and more preferably 10 ppm or less. Conventionally, in the oxidation catalyst (DOC), it has not been performed to evaluate itself by measuring the amount of platinum which volatilizes from DOC and adheres to the selective reduction catalyst (SCR), after 20 hours have passed, however, when it was measured similarly, it was 20 to 40 ppm even for the oxidation catalyst (DOC) known to exhibit the highest performance. Based on the above fact, in the catalyst apparatus I applied the oxidation catalyst (DOC) with the present invention, it can be said extremely significant effect that the amount of platinum which adheres to the selective reduction catalyst (SCR) becomes 12 ppm or less, after 20 hours have passed.

3. [The Reducing Agent Spraying Means]

In the exhaust gas purification catalyst apparatus of the present invention, the reducing agent spraying means is the one for supplying the reducing agent selected from the urea component or the ammonia component, and usually composed of a storage tank of the reducing agent, a piping and a spraying nozzle attached at the tip thereof.

Position of the reducing agent spraying means is set at a position backward of the oxidation catalyst (DOC), and forward of the selective reduction catalyst (SCR) for contacting nitrogen oxides ($NO_x$) with the reducing agent to reduce. And, in the case where DPF or CSF is set between DOC and SCR, it is preferable to be arranged at the backward of DPF or CSF.

Kind of the reducing component is selected from the urea component or the ammonia component. As the urea component, an aqueous solution of urea, having a specified concentration of 31.8 to 33.3% by weight, for example, a trade name of "Adblue", and as the ammonia component, ammonia gas may be used other than ammonia water. However, because $NH_3$, which is the reducing agent, itself has harmfulness such as irritating odor, it is a preferable system that $NH_3$ is generated by thermal decomposition or hydrolysis by adding an aqueous solution of urea from the upstream of the denitration catalyst, and which is acted as the reducing agent, as compared with use of the $NH_3$ component as it is, as the reducing agent.

II. [the Exhaust Gas Purification Catalyst Apparatus (DOC+DPF+SCR)]

The exhaust gas purification catalyst apparatus of the present invention is capable of arranging a combustion filter (DPF) not including the noble metal component for capturing particulate components (PM) in exhaust gas, and removing them by combustion (oxidation), at the backward of the oxidation catalyst (DOC), and at the forward of the reducing agent spraying means, in an exhaust gas purification apparatus arranged with an oxidation catalyst (DOC) including a noble metal component for oxidizing nitrogen oxides (NO) in an exhaust gas discharged from a diesel engine, a reducing agent spraying means for supplying the reducing agent selected from a urea component or an ammonia component, and a selective reduction catalyst (SCR) not including a noble metal for removing by reduction nitrogen oxides ($NO_x$) by contacting with the reducing agent, in this order from the upstream side of an exhaust gas passage. Hereafter this exhaust gas purification catalyst apparatus (DOC+DPF+SCR) may also be referred to as the catalyst apparatus II.

Figure 2:
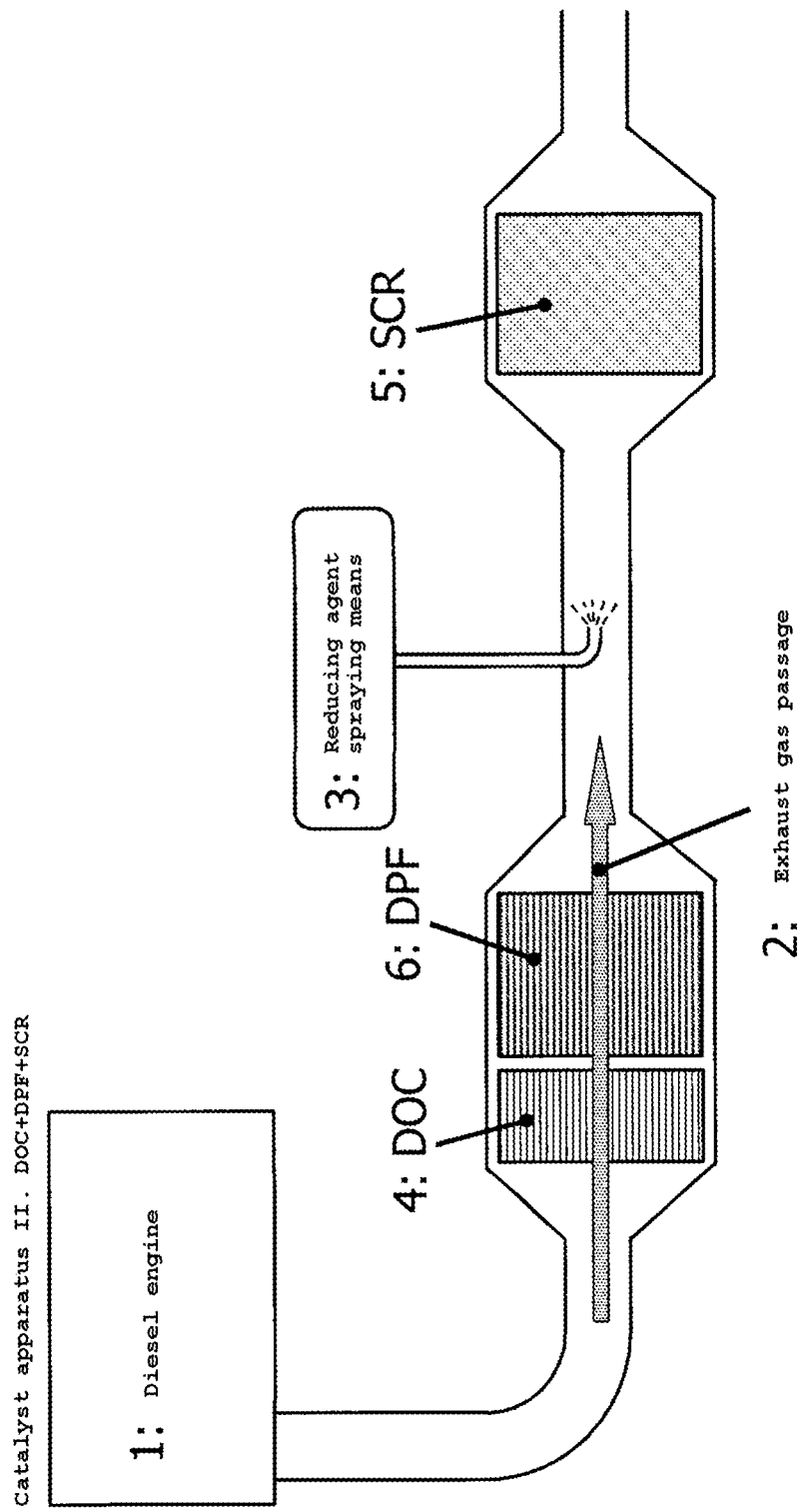
FIG. 2 is an explanation drawing showing schematically a configuration, where an oxidation catalyst (DOC), a combustion filter (DPF), a reducing component supplying means, and a selective reduction catalyst (SCR) are arranged in this order, in an exhaust gas purification apparatus of the present invention.

That is, the catalyst apparatus II of the present invention is, as shown in FIG. 2, an exhaust gas purification catalyst apparatus set with a reducing agent spraying means 3 at the backward of the oxidation catalyst (DOC) 4 and a combustion filter (DPF) 6 in an exhaust gas passage 2 from a diesel engine 1, and arranged with the selective reduction catalyst (SCR) at the backward of this injection means 3.

4. [DPF: Combustion Filter]

In the present invention, the combustion filter (DPF) is the one based on a wall-flow-type honeycomb structure having through holes integrated in a honeycomb shape, which is open at one of the above opening part of the through hole and is closed at the other end, and is used as a structure not including the noble metal component, for capturing particulate components (PM) in exhaust gas, and removing them by combustion (oxidation).

In the catalyst apparatus II, by setting that the noble metal component of the oxidation catalyst (DOC) contains platinum and palladium, and ratio of Pt particles existing alone is 20% or less, or average particle diameter of the noble metal is 4 nm or larger, scattering of platinum can be suppressed and activity of the selective reducing catalyst (SCR) catalyst can be maintained, even when filter bed of the combustion filter (DPF) is raised up to 900° C.

(Relation Between DOC+DPF and the SCR Catalyst)

Because the catalysts of DOC+SCR are combined in the above catalyst apparatus I, it exerts superior activity in purification of HC, CO and $NO_x$, however, it is worried in that combustion purification of the floating particulate matter such as soot or SOF is a little inferior.

In fact, in a large diesel engine, there may be the case where $NO_x$ and the floating particulate matter are generated in a large quantity in exhaust gas from the engine, in relation to a control method, and the case where the floating particulate matter is present in a large quantity requires removing of the floating particulate matter using DPF.

DPF has a wall-flow-type honeycomb structure not including the noble metal component, and at the filter cell wall thereof has countless holes with an average pore diameter of 20 to 40 μm. Gas passes through these pores, however, SOF of 30 to 80 nm or a particulate such as soot of 50 to 400 nm is trapped in the countless pores opened in the cell wall.

Accordingly, in the catalyst apparatus II of the present invention, by arranging DPF after DOC, soot or SOF is designed to be trapped at the filter cell wall of DPF. In this way, soot and SOF can be removed by combustion (oxidization) completely at one sweep, by heating when they are accumulated to some extent.

The trap effect by the pores opened countlessly at the filter cell wall of this DPF is effective in trapping not only SOF or soot but also the noble metal component such as Pt scattering from DOC. Because DPF, having a wall-flow-type honeycomb structure, has the pores of 20 to 40 nm, as compared with a flow-through-type honeycomb structure having a cell hole, through which gas passes, of square or hexagonal shape of several mm length, the trap effect thereof is extremely superior.

Therefore, amount of the noble metal such as Pt scatters from DOC and adheres to SCR can considerably be decreased by arrangement of DPF between them, as compared with the case of the catalyst apparatus I (DOC+SCR).

III. [The Exhaust Gas Purification Catalyst Apparatus (DOC+SCRF)]

In the present invention, in an exhaust gas purification apparatus arranged with an oxidation catalyst (DOC) including a noble metal component for oxidizing nitrogen oxides (NO) in an exhaust gas discharged from a diesel engine, a reducing agent spraying means for supplying the reducing agent selected from a urea component or an ammonia component, and a selective reduction catalyst (SCR) not including a noble metal for removing by reduction nitrogen oxides ($NO_x$) by contacting with the reducing agent, in this order from the upstream side of an exhaust gas passage, as said selective reduction catalyst (SCR), a selective reduction catalyzed combustion filter (SCRF) can be used, where said selective reduction catalyst is coated on a combustion filter (DPF) not containing the noble metal component, for capturing particulate components (PM) in exhaust gas, and removing them by combustion (oxidation). Hereafter this exhaust gas purification catalyst apparatus (DOC+SCRF) may also be referred to as the catalyst apparatus III.

Figure 3:
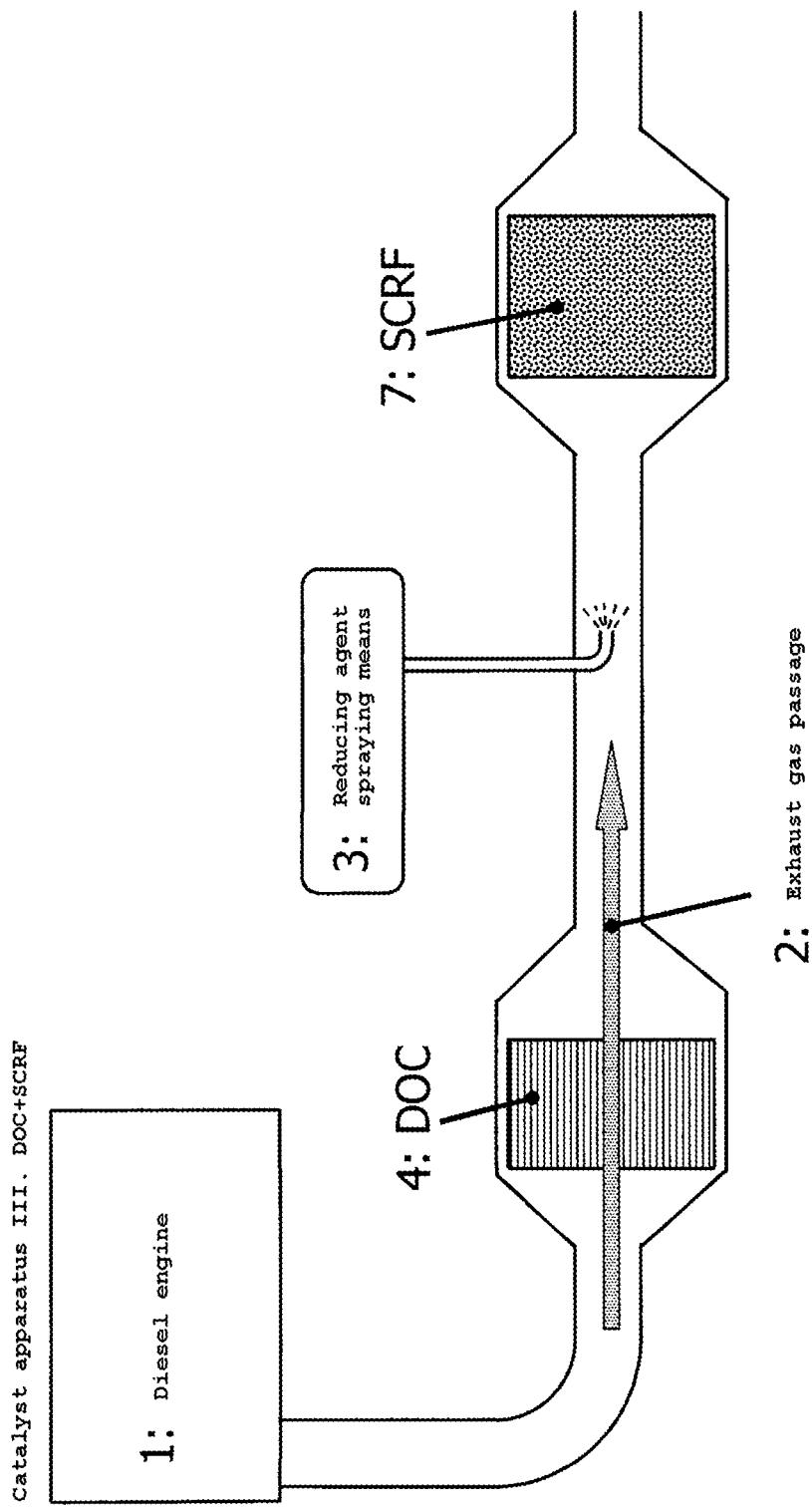
FIG. 3 is an explanation drawing showing schematically a configuration, where an oxidation catalyst (DOC), a reducing component supplying means, and a combustion filter (SCRF) coated with a selective reduction catalyst (SCR) are arranged in this order, in an exhaust gas purification apparatus of the present invention.

That is, the catalyst apparatus III of the present invention is, as shown in FIG. 3, an exhaust gas purification catalyst apparatus set with a reducing agent spraying means 3 at the backward of the oxidation catalyst (DOC) 4, and arranged with a combustion filter (SCRF) 7 coated with the selective reduction catalyst at the backward of this injection means 3, in an exhaust gas passage 2 from a diesel engine 1.

5. [The SCRF Catalyst: The Combustion Filter Covered with the Selective Reduction Catalyst]

In the present invention, the SCRF catalyst is a combustion filter covered with the selective reduction catalyst, and has both of function of the selective reduction catalyst (SCR) not including the noble metal for reductional removal of nitrogen oxides (NOx) by contacting with the reducing agent, and function of the combustion filter (DPF) not including the noble metal component for capturing and removing by combustion (oxidation) of the particulate component (PM) in exhaust gas.

As described above, in the catalyst apparatus I, although superior activity is exerted for purifying HC, CO and $NO_x$, oxidation purification of soot or SOF may sometimes become insufficient, therefore by installing DPF after DOC, it is designed to trap soot and SOF at the filter cell wall. In this way, soot and SOF are expected to be removed by combustion (oxidization) completely all at one sweep, by heating when they are accumulated to some extent. However, this causes increase in installation space for DPF.

On the contrary, in the catalyst apparatus III of the present invention, by arranging the combustion filter covered with the selective reduction catalyst (SCRF catalyst) instead of the SCR catalyst of the catalyst apparatus I, within a limited space, it is designed to have both of function of the selective reduction catalyst (SCR) and function of the combustion filter (DPF).

(DPF Having High Porosity)

As a practical problem, in the case of a medium diesel engine, although harmful components (HC, CO, $NO_x$, soot, SOF and the like) in various kinds of exhaust gas are suppressed to some extent in relation to a control method, decrease in loaded number of catalysts has been required, in relation to loaded space of the catalysts.

Accordingly, in recent years, there has been investigated on reducing loaded number of the catalysts by coating the selective reduction catalyst (SCR) onto the wall-flow-type honeycomb structure having combustion filter (DPF) function, instead of the flow-through-type honeycomb structure usually used.

However, in a usual wall-flow-type honeycomb structure (DPF), it was required that amount of the catalyst to be coated should be suppressed to half or less as compared with in a usual flow-through-type honeycomb structure to suppress pressure drop, as will be described in the CSF section.

However, in the case of SCR, different from CSF where the noble metal supported on to the inorganic material becomes an active site of the oxidation reaction, because the inorganic material itself becomes an active site of the denitration reaction, reducing the catalyst amount by half could reduce the activity by half as well.

Accordingly there has been developed DPF with high porosity and low pressure drop, by having increased number of pores (increased porosity) at the filter cell wall, as compared with usual DPF. By using this DPF with high porosity and low pressure drop, coating the same amount of the SCR catalyst component, as in supporting the SCR catalyst component onto the usual flow-through-type honeycomb structure, has become possible for the first time.

Also in this case, the oxidation catalyst (DOC) can maintain activity of the selective reduction catalyst (SCR), by setting that the noble metal component contains platinum and palladium, and ratio of Pt particles existing alone is 20% or less, or average particle diameter of the noble metal is 4 nm or larger, and by suppressing scattering of platinum, even when catalyst bed temperature of the oxidation catalyst (DOC) is raised up to 900° C.

In the catalyst apparatus III of the present invention, it is desirable that SCRF (DPF coated with SCR) is the wall-flow-type honeycomb structure obtained by making a sintered body of an inorganic oxide such as silica, alumina, silicon carbide porous, or cordierite, and it is desirable to use DPF with high porosity and low pressure drop, by having increased number of pores at the filter cell wall. By using this DPF with high porosity and low pressure drop, coating the same amount of the SCR catalyst component, as in the usual flow-through-type honeycomb structure, has become possible, without increasing pressure drop.

As for the inorganic base material, all of zeolite and the porous inorganic oxides described in detail in the SCR section can be used.

(Relation Between DOC and the SCRF Catalyst)

In the above-described DOC+DPF+SCR or DOC+CSF+SCR to be described later, because all of HC, CO, NOx, soot, and SOF, which are harmful components in exhaust gas, are purified, it is very preferable, however, there may be the case where all of these catalysts cannot be loaded in relation to storage space, when loading them on an automobile. In the above-described DOC+SCR, although storage space is small, there is a little worry in purification of soot and SOF.

Accordingly, it is effective to arrange SCRF having DPF and SCR combined into one (DPF coated with the SCR catalyst component) at the backward of DOC. It is because, as described in the section of DOC+DPF+SCR, soot and SOF are trapped at DPF, and removed by combustion (oxidization), when they are accumulated to some extent.

In addition, NO oxidized at DOC can be expected to be purified by easily reacted with $NH_3$ at the SCR catalyst component covered, in passing through the filter cell wall of DPF. As compared with DOC+CSF+SCR to be described later, although there is a little worry in purification performance of HC, CO and $NO_x$, in the case where all catalysts of DOC+CSF (or DPF)+SCR cannot be loaded, in relation to storage space, attainment of the maximum purification effect can be expected by effective use of limited space to the maximum.

Also in SCRF, although zeolite and the above inorganic material exert superior $NO_x$ reduction purification performance, as described above, there may be the case where activity is significantly decreased when contaminated with the noble metal component such as Pt. However, as in the present invention, by setting that the noble metal component of the oxidation catalyst (DOC) contains platinum and palladium, and ratio of platinum particles existing alone is 20% or less, or average particle diameter of the noble metal is 4 nm or larger, and by suppressing scattering of Pt from DOC, contamination of the SCRF catalyst by Pt can be prevented, and $NO_x$ reduction purification performance at the SCR catalyst can be enhanced by utilization of $NO_2$ generated by DOC.

It should be noted that a catalyst to be arranged at the backward of SCRF is not especially limited, and a catalyst including the noble metal component may be arranged.

IV. [The Exhaust Gas Purification Catalyst Apparatus (DOC+CSF+SCR)]

The present invention is an exhaust gas purification catalyst apparatus arranged with an oxidation catalyst (DOC) including a noble metal component for oxidizing nitrogen oxides (NO) in exhaust gas discharged from a diesel engine, a catalyzed combustion filter (CSF) including the noble metal component for capturing, and removing by combustion (oxidation) the particulate component (PM) in exhaust gas, a reducing agent spraying means for supplying the reducing agent selected from a urea component or an ammonia component, and a selective reduction catalyst (SCR) not including a noble metal, for removing by reduction nitrogen oxides ($NO_x$) by contacting with the reducing agent, in this order from the upstream side of an exhaust gas passage, and this exhaust gas purification catalyst apparatus (DOC+CSF+SCR) is also referred to as the catalyst apparatus IV.

Figure 4:
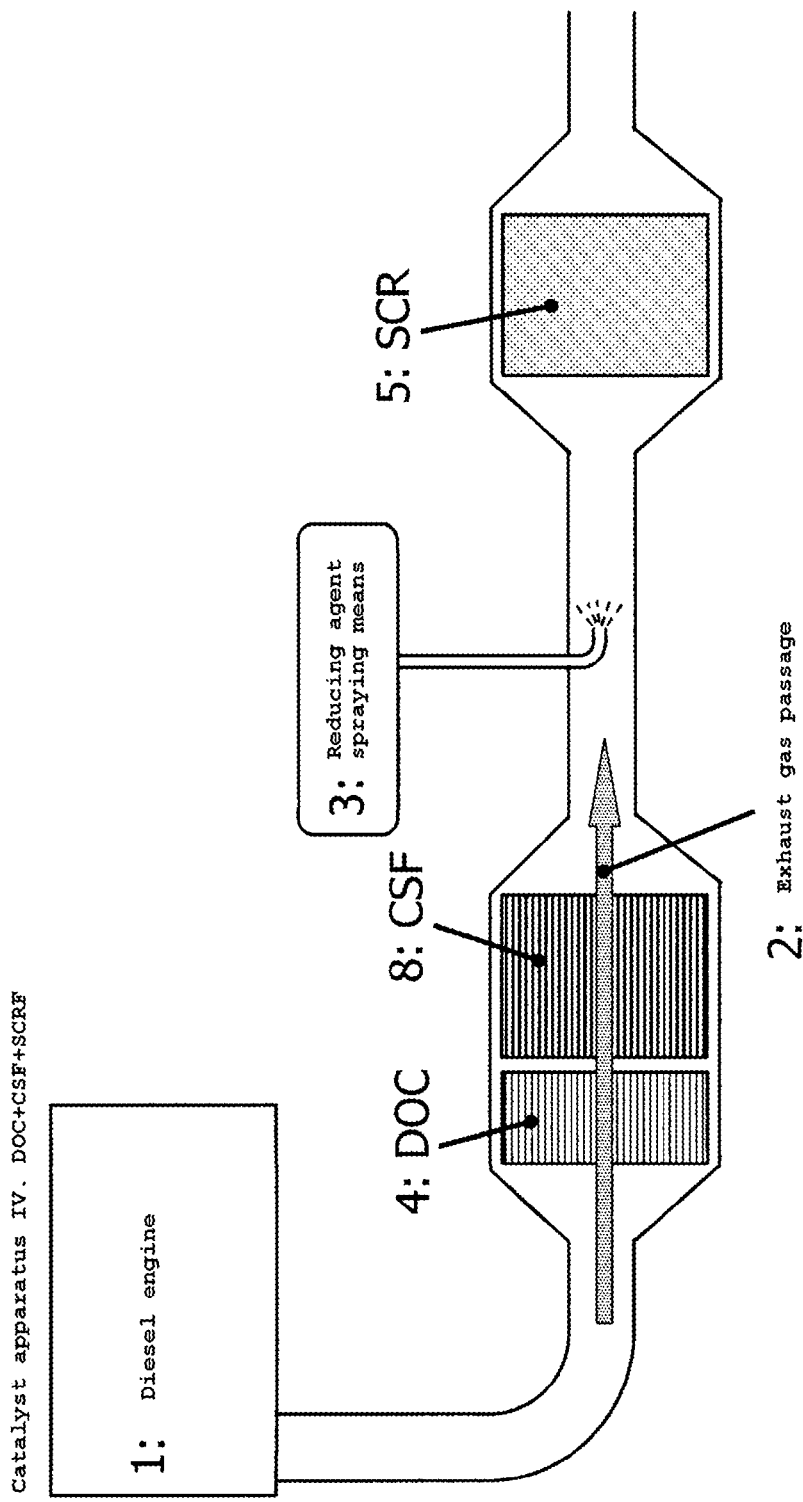
FIG. 4 is an explanation drawing showing schematically a configuration, where an oxidation catalyst (DOC), a catalyzed filter (CSF), a reducing component supplying means, and a selective reduction catalyst (SCR) are arranged in this order, in an exhaust gas purification apparatus of the present invention.

That is, the catalyst apparatus IV of the present invention is, as shown in FIG. 4, an exhaust gas purification catalyst apparatus set with the reducing agent spraying means 3 at the backward of the oxidation catalyst (DOC) 4 and the catalyzed combustion filter (CSF) 8 in an exhaust gas passage 2 from a diesel engine 1, and arranged with the selective reduction catalyst (SCR) 5 at the backward of this injection means 3.

6. [CSF: Catalyzed Combustion Filter]

In the present invention, the catalyzed combustion filter (CSF) is a catalyzed combustion filter including the noble metal component for capturing, and removing by combustion (oxidation) of the particulate component (PM) in exhaust gas discharged from a diesel engine.

In the catalyst apparatus IV of the present invention, it is acceptable that CSF is a bag filter having high heat resistance, however, it is desirable to catalyze and use the wall-flow-type honeycomb structure obtained by making porous a sintered compact of an inorganic oxide such as silica, alumina, silicon carbide, or cordierite.

CSF contains at least the platinum component and the palladium component as the noble metal component. Inclusion of the Pt component is capable of enhancing $NO_x$ reduction purification performance in the SCR catalyst at the latter part of CSF, by exerting $NO_x$ oxidation performance also at even CSF, and by increasing $NO_2$ concentration in exhaust gas.

In addition, addition of the Pd component to the Pt component is expected to suppress volatilization of the Pt component. The catalyzed combustion filter (CSF) has a ratio of platinum and palladium of preferably 1:1 to 11:4, and more preferably 3:2 to 11:4, in weight equivalent. Outside of this range is not preferable similarly as in the above-described DOC. It is because, the ratio below 1:1 largely decreases oxidation activity of HC, CO, NO or the like accompanied with decrease in content rate of platinum, while the ratio over 11:4 increases decrease in denitration performance of SCR caused by the noble metal such as platinum volatilized, even under coexistence with palladium. And, the catalyzed combustion filter (CSF) has a supported amount of platinum of preferably 0.1 to 2.0 g/L, and more preferably 0.3 to 1.5 g/L, in metal equivalent.

Further, in the present invention, a coated amount of an oxidizing component, which composes a catalyst layer of the catalyzed combustion filter (CSF), is preferably 5 to 150 g/L, and more preferably 10 to 100 g/L. The coated amount of the oxidizing component below 5 g/L deteriorates dispersibility of the noble metal such as platinum to be supported, thus causing decrease in oxidation activity, while the amount over 150 g/L narrows pores opened countlessly at the filter cell wall, causing increase in pressure drop, and thus is not preferable.

Such CSF, in the present invention, may be said "a structure covered with the oxidation catalyst composition" similarly as DOC.

Similarly as the above-described DOC, the honeycomb structure is used also for CSF. In particular, it is desirable to use a wall-flow-type substrate having through holes, integrated in a honeycomb shape, which are open at one of the opening part of the through hole and are closed at the other end. In the wall-flow-type substrate, wall of the through hole is composed of a porous material, and the particulate matter enters into the through hole together with exhaust gas from the through hole opening part, and exhaust gas passes through the porous hole of the through hole wall and is discharged backward, and the particulate component deposits in the through hole closed. By combustion removal of the particulate component deposited in this way, as described above, CSF is regenerated and becomes possible again to capture the particulate component from exhaust gas.

However, different from the flow-through-type honeycomb structure to be used in DOC, because the wall-flow-type honeycomb structure having function as a filter is used, the catalyst component to be used as CSF is required to have also different function from DOC, while having the same function as DOC.

In fact, coating of the same amount of the catalyst component on the wall-flow-type honeycomb structure, as on the flow-through-type honeycomb structure, increases pressure drop abnormally, thus significantly decreasing output of an engine, although the through hole wall is made of a porous material. Therefore, in the case of coating the catalyst component on the wall-flow-type honeycomb structure, amount of the catalyst component is preferably set to half or less, as compared with on the flow-through-type honeycomb structure.

Therefore, it is necessary that use amount of the noble metal such as platinum is also halved or less in CSF. However, even by setting amount of the noble metal to half or less, as for oxidation performance of $NO_x$, high purification performance is required, therefore as for a dispersion state of the noble metal such as platinum, a dispersion level equal to or higher than DOC is required.

Accordingly, as for suppressing the volatilization of platinum, severer condition equal to or higher than DOC is required. In CSF, by setting so that the noble metal component contains platinum and palladium, and ratio of platinum particles existing alone is 3% or less, volatilization of platinum is suppressed when catalyst bed temperature of CSF increases up to 900° C., activity of the selective reduction-type catalyst (SCR) becomes maintained.

In the present invention, an amount of platinum which volatilizes from the catalyzed combustion filter (CSF) and adheres to the selective reduction catalyst (SCR) is preferably 12 ppm or less, and more preferably 10 ppm or less, after 20 hours have passed, when catalyst bed temperature of CSF increases up to 900° C.

As for the inorganic base material, all of the porous inorganic oxides described in detail in the DOC section may be used.

(Relation Between DOC+CSF and SCR Catalyst)

According to the catalyst apparatus II (DOC+DPF+SCR) of the present invention, also as for soot and SOF, other than HC, CO or $NO_x$ or the like, exertion of high purification performance can be expected. However, because DPF has no oxidation catalyst function, it is necessary to raise temperature of the filter bed of DPF up to 900° C. to completely combust soot. In order to raise temperature of the filter bed, it is necessary to supply relatively large quantity of fuel to an engine to generate unburned HC and to supply it to DOC, or supply fuel to DOC by direct spraying, which anyhow incurs deterioration of fuel efficiency.

In such a case, by using CSF which furnishes oxidation catalyst function to DPF, so that combustion of the floating particulate matter such as soot and SOF adhered to DPF, can be started from lower temperature, because combustion of the floating particulate matter adhered to DPF starts from relatively low temperature, decrease in consumption of combustion fuel of the floating particulate matter becomes possible. In addition, in the case of a large quantity of discharge amount of NO, NO cannot be sufficiently oxidized to $NO_2$ only by DOC, however, CSF can also oxidize NO not completely oxidized at DOC further to $NO_2$. The catalyst apparatus IV of the present invention is a combination of DOC+CSF+SCR, where CSF covered the oxidation catalyst component onto DPF is arranged after DOC, to not only purify all of the HC, CO, $NO_x$ and the floating particulate matter in high efficiency but also to enhance fuel efficiency as well.

In fact, in a large diesel engine, there may be the case where $NO_x$ and the floating particulate matter are generated in a large quantity in exhaust gas from the engine, in relation to a control method, and in the case where not only the floating particulate matter but also $NO_x$ are present in a large quantity, by incorporating CSF into the catalyst system of DOC–SCR, it becomes possible not only combustion removal of the floating particulate matter by oxidation combustion function of CSF, from relatively low temperature but also oxidation of NO not completely treated only by DOC further to $NO_2$.

Because CSF has a filter cell wall of DPF (a wall-flow-type honeycomb structure) coated with the oxidation catalyst component, the oxidation catalyst component more easily contacts with HC, CO, NO or the like in exhaust gas, as compared with DOC (coated with the oxidation catalyst on the cell wall of a flow-through-type honeycomb structure), due to easier contact between the oxidation catalyst component and HC, CO and NO or the like in exhaust gas, unburned HC, CO and NO, which were not oxidized completely by DOC, can be removed by oxidation.

In addition, CSF generates heat by oxidizing HC, CO and NO, ignition starts at lower temperature as compared with DPF not coated with the oxidation catalyst, thus it is preferable in view of fuel efficiency, because of requiring small amount of fuel to be added to combust soot and SOF.

Zeolite or the above inorganic material of the SCR catalyst exerts superior $NO_x$ reduction purification performance, however, as described above, there may be the case where activity is significantly decreased when contaminated with Pt. However, in the catalyst apparatus IV of the present invention, by setting that the noble metal component of CSF contains platinum and palladium, and ratio of platinum particles existing alone is 3% or less, and by suppressing volatilization of platinum, when catalyst bed temperature of CSF increases up to 900° C., activity of the selective reduction catalyst (SCR) becomes maintained. That is, by suppression of scattering of Pt from CSF, contamination of the SCR catalyst by Pt can be prevented, and $NO_x$ reduction purification performance at the SCR catalyst can be enhanced by utilization of $NO_2$ generated by DOC and CSF.

It should be noted that as for Pt scattering from DOC, because the oxidation catalyst component of CSF combusts the floating particulate matter such as soot, from relatively low temperature, catalyst bed temperature of DOC in the catalyst system of DOC+CSF+SCR is enough to be considerably lower temperature as compared with catalyst bed temperature of DOC in the catalyst system of DOC+DPF+SCR, therefore scattering amount of Pt is significantly decreased as compared with DOC+DPF+SCR. Because of very small amount of Pt scattering from DOC, it is rare that scattered Pt passes through CSF and adheres to the catalyst component of SCR arranged further after that. That is, it can be considered that Pt assumed to adhere onto SCR is all Pt derived from CSF.

As for CSF, as described above, because a substrate to be used is the wall-flow-type honeycomb structure and suppresses pressure drop, as compared with DOC using the low pressure drop flow-through-type honeycomb structure, amount of the catalyst to be coated is reduced to half and irrespective of the fact that also amount of the noble metal is reduced to half, dispersibility of the noble metal should be enhanced so as to maintain high oxidation activity of $NO_x$. That is, particle diameter of the noble metal should be made smaller as compared with DOC.

Accordingly, in any DOC of the above-described catalyst apparatuses I to III, by making average particle diameter of the noble metal 4 nm or larger, a method for suppressing scattering of Pt was possible, however, in the catalyst apparatus IV of the present invention, such a method cannot be taken, and thus it is necessary to set that the noble metal component of the catalyzed combustion filter (CSF) contains platinum and palladium, and ratio of platinum particles existing alone is 3% or less. It is preferable for ratio of the platinum particle existing alone to be 2.5% or lower, and more preferably 2.0% or lower.

As for the inorganic base material, all of the porous inorganic oxides described in detail in the DOC section can be used. In addition, also as for the starting salt of the noble metal such as platinum, all of the raw materials described in detail in the DOC section can be used.

However, as described above, in order to suppress volatilization of platinum by attaining higher dispersion of the noble metal such as platinum, as compared with DOC, it is necessary to match property (acidity, alkalinity) of aqueous solutions of each of the starting salts of platinum and palladium, and both should be mixed with the inorganic base material in a state of uniformly mixed solution by mixing. In a method for mixing the solution of the starting salts of platinum and palladium having different property each separately, with the inorganic base material, number of platinum fine particles existing alone increases inevitably, as compared with the case of mixing a mixed solution of platinum and palladium with the inorganic base material, and thus is not preferable.

In addition, the catalyst arranged at the backward of SCR is not especially limited, and a catalyst including the noble metal component may be arranged.

In the present invention, when catalyst bed temperature of the catalyzed combustion filter (CSF) is raised up to 900° C., an amount of platinum which volatilizes from the catalyzed combustion filter (CSF) and adheres to the selective reduction catalyst (SCR) is preferably 12 ppm or less, and more preferably 10 ppm or less, after 20 hours have passed. Conventionally, in the catalyzed combustion filter (CSF), evaluation itself has not been performed by measuring the amount of platinum which volatilizes from CSF and adheres to the selective reduction catalyst (SCR), after 20 hours have passed, however, when it was measured similarly, it was 20 to 30 ppm even for the catalyzed combustion filter (CSF) considered to exhibit the highest performance. Based on the above result, it can be said extremely significant action effect that the amount of platinum which adheres to the selective reduction catalyst (SCR) becomes 12 ppm or less, after 20 hours have passed, in the catalyst apparatus IV using the catalyzed combustion filter (CSF) of the present invention.

In the catalyst apparatus IV of the present invention, as the oxidation catalyst (DOC), a conventional type oxidation catalyst may be used. That is, it does not limit use of the oxidation catalyst (DOC), where the noble metal component of the oxidation catalyst (DOC) contains platinum and does not contain palladium, or even when containing platinum and palladium, ratio of platinum particles existing alone is over 20%, or average particle diameter of the noble metal is less than 4 nm. However, in such a conventional type catalyst, because there is no consideration on suppression of scattering of Pt at high temperature, there may be the case, when catalyst bed temperature of the oxidation catalyst (DOC) is raised up to 900° C., an amount of platinum which volatilizes from the oxidation catalyst (DOC) and adheres to the selective reduction catalyst (SCR) cannot be attained 12 ppm or less, after 20 hours have passed.

In such a case, it is desirable to use the oxidation catalyst (DOC) where suppression of Pt scattering at high temperature is considered, as described in the above catalyst apparatus I of the present invention. It has been confirmed that by using this in combination with CSF, still more significant action effect (synergy effect) can be obtained as compared with using each alone.

7. [AMOX: The Ammonia Oxidation Catalyst]

In the exhaust gas purification apparatus of the present invention, the ammonia oxidation catalyst (AMOX) can be arranged, further after SCR, as needed. In a practical way, in the case where $NO_x$ or $NH_3$ cannot be purified completely down to regulated value or lower by SCR, AMOX is used additionally.

Accordingly, AMOX includes also a catalyst component having $NO_x$ purification function, other than a catalyst having $NH_3$ oxidation function. As a catalyst having $NH_3$ oxidation function, it is preferable to support one or more elements selected from platinum, palladium, or rhodium and the like, as noble metal component, on one or more kinds of inorganic materials consisting of alumina, silica, titania, zirconia and the like. In addition, it is also preferable to use an inorganic material having heat resistance enhanced by adding a promoter such as a rare earth, an alkali metal, or an alkaline earth group. As the noble metal, in particular, platinum and palladium exert superior oxidation activity, therefore by using the above inorganic material having large specific surface area and also high heat resistance, sintering of the noble metal component becomes difficult, and by maintaining specific surface area of the noble metal high, active site increases and high activity can be exerted.

On the other hand, as the catalyst having $NO_x$ purification function, all of the zeolite and oxides described at the SCR section can be used.

These two kinds of catalysts are mixed uniformly and may be coated onto an integrated-type honeycomb structure, however, the catalyst having $NH_3$ oxidation function may also be coated onto the lower layer, and the catalyst having $NO_x$ purification function may also be coated onto the upper layer.

EXAMPLES

Characteristics of the present invention will be made further clearer below by showing Examples and Comparative Examples, however, the present invention should not be limited to aspects of these Examples. It should be noted that components and composition of the oxidation catalyst (DOC), the catalyzed combustion filter (CSF) and the selective reduction-type catalyst (SCR) to be used in the present Examples and Comparative Examples are measured by methods shown below.

(1) Free Pt Particle Ratio (%)

Only a part of the washcoat of the catalyst was scraped for observation with scanning transmission type electron microscope (STEM) in a magnification (300 to 500 thousand magnifications) for giving good view of a distribution state of the noble metal particles on the base material. 16 to 20 arbitrary noble metal particles were selected to perform each qualitative analysis using Energy dispersive X-ray spectrometer (EDS) and investigated whether they are single Pt particles, single Pd particles, or Pt—Pd alloy particles. It was determined what % of single Pt particles were present in total particles measured, and it was adopted as free Pt particle ratio (%).

Free Pt particle ratio (%)=[number of single Pt particles]/[number of total particles measured]×100

(2) Particle Diameter of the Initial Noble Metal Component (nm)

Only a part of the washcoat of the catalyst was scraped for observation with scanning transmission type electron microscope (STEM) in a magnification (300 to 500 thousand magnifications) for giving good view of a distribution state of the noble metal particles on the base material. From an image observed, equivalent circle diameter for about 300 pieces of the noble metal particles was determined, using image analysis software. These average values were calculated as particle diameter of the initial noble metal component.

<Evaluation of Pt Scattering Suppression Effect>

As for the selective reduction catalyst (SCR) after aging, denitration performance was measured using model gas under the following condition. $NO_x$ conversion after denitration was measured using a mass spectrometer. Results thereof are described in Table 2.

Model gas composition:
NO=200 ppm, $NO_2$=50 ppm
$NH_2$=250 ppm, $CO_2$=100 ppm
$O_2$=5%, $H_2O$=10%, $N_2$=balance
Model gas flow rate: 9.3 L/min
(Space velocity conversion in the SCR (1): 61,000/h)
Temperature of a catalyst bed of SCR (1) whose $NO_x$ purification capability was measured: 300° C., 500° C.

In evaluation of presence or absence of Pt scattering suppression effect according to the present test method, the more amount of platinum included in the selective reduction catalyst (SCR) decreases $NO_x$ purification ratio the more, due to tendency of oxidation of $NH_3$ supplied originally to reduce $NO_x$ by platinum, however, because the higher temperature enhances $NH_3$ oxidation capability by platinum the more, decrease in $NO_x$ purification rate becomes the larger, in particular at 500° C., as compared with 300° C. In addition, the more platinum amount included in the selective reduction catalyst (SCR) increases $N_2O$ discharge concentration at 300° C. Accordingly, the larger value of C300/C500, as well as the smaller value of $N_2O$@300° C. results in the higher effect of Pt scattering suppression.

In the present invention, in activity evaluation of the selective reduction catalyst (SCR) after durability test, such criterion was adopted: OK (denitration performance was maintained), when the value of C300/C500, to be described later, is 0.9 or larger; and NG (denitration performance was not maintained), when it is below 0.9.

After that, platinum concentration included in SCR used in the above denitration performance test, was measured using an ICP optical emission spectrometer. The result is shown together in Table 2. It was so evaluated that the lower platinum concentration included in SCR after the denitration performance test has the higher suppression effect of Pt scattering.

Example 1

Production of the Oxidation Catalyst DOC (1)

Onto 300 g of alumina powder (γ-alumina, containing 2% by weight of La, specific surface area: 200 m²/g) as a base material, an ethanol amine solution of platinum hydroxide (IV) as a raw material of the noble metal component, was impregnated and supported, so as to attain 0.75% by weight in Pt equivalent, to obtain Pt-supported alumina powder. Then, onto the above Pt-supported alumina powder, an aqueous solution of palladium nitrate was impregnated and supported, so as to attain 0.25% by weight in Pd equivalent, to obtain Pt—Pd-supported alumina powder (Pt:Pd=3:1). And, the Pt—Pd-supported alumina powder, commercial refined sugar (10% by weight of the alumina powder) and water were put into a ball mill and milled till specified particle diameter is attained, to obtain slurry.

Subsequently, an integral structure-type substrate, that is, a honeycomb flow-through-type cordierite substrate (300 cells/8 mil, a diameter of 24 mm, a length of 66 mm), was immersed into this slurry, and coated so as to attain a catalyst supported amount of 200 g/L per unit volume, by a wash-coat method, after that dried at 150° C. for 1 hour and calcined at 500° C. for 2 hours under atmosphere to obtain DOC (1) (amount of noble metal: 2.0 g/L).

Free Pt particle ratio (%) and initial noble metal component particle diameter (nm) of the obtained oxidation catalyst DOC (1) were measured by the above-described methods, and the results are shown in Table 1.

<The Selective Reduction Catalyst (SCR)>

Concentrations of β-Type zeolite ion exchanged with an iron element (in iron element equivalent: concentration of 2% by weight, ion exchanged amount: 70%, SAR=35) and silica as a binder were adjusted with water, and by milling them using a ball mill, raw material slurry of an SCR catalyst composition was obtained. In this case, ratio of β-Type zeolite ion exchanged with an iron element, and silica was set at 10:1 in weight ratio. An integral structure-type carrier, that is, a honeycomb flow-through-type cordierite substrate (300 cells/8 mil, a diameter of 24 mm, a length of 20 mm), was immersed into this slurry, and coated so as to attain a catalyst supported amount of 220 g/L per unit volume, by a wash-coat method, and after drying, calcined at 500° C. for 2 hours under atmosphere, to obtain the SCR catalyst.

<The Pt Scattering Test>

Figure 5:
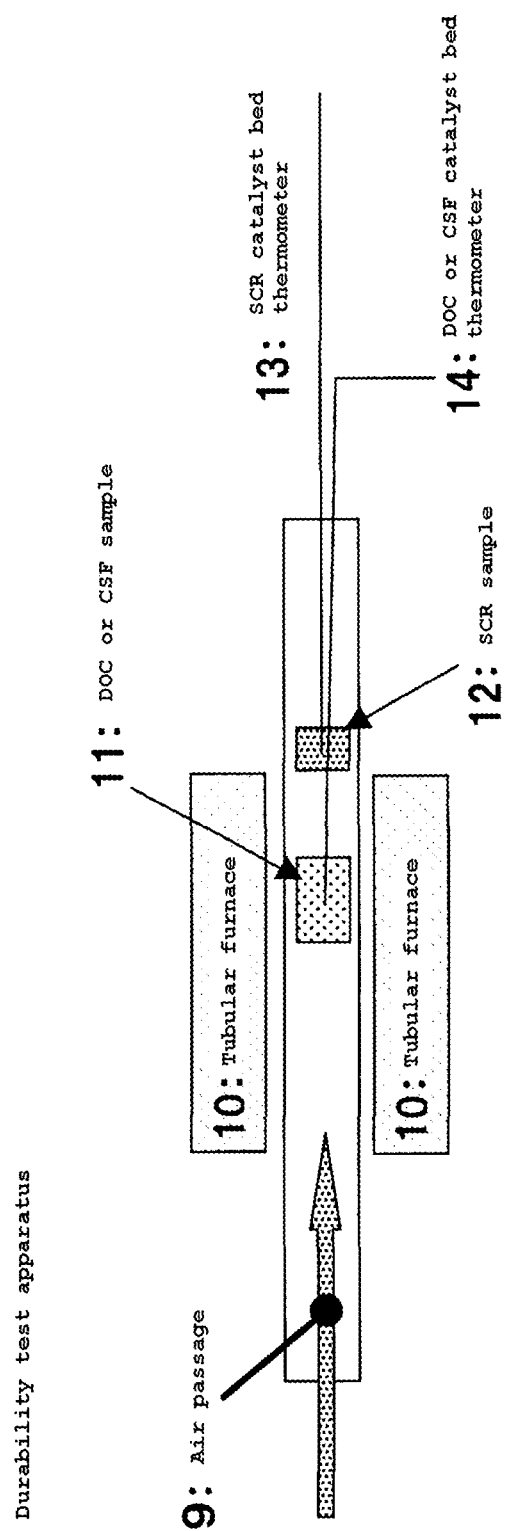
FIG. 5 is an explanation drawing showing schematically apparatus configuration to be used in a durability test of an exhaust gas purification catalyst in the present invention.

As shown in FIG. 5, a sample 11 of the oxidation catalyst (DOC) or the catalyzed filter (CSF) and a sample 12 of the selective reduction catalyst (SCR) were each fixed and arranged at specified positions by rolling with a heat insulating material (KAOWOOL), in a quartz tube (an inner diameter of 30 mm, a length of 700 mm) of a tubular furnace 10, to compose a durability test apparatus of a catalyst relevant to the present invention. Using this apparatus, heated air 9 was passed through for 20 hours in a flow rate of 10 L/minute, so as to attain a catalyst bed temperature of the oxidation catalyst (DOC) of 900° C., to perform durability treatment. It should be noted that distance between the oxidation catalyst (DOC) or the catalyzed filter (CSF) and the SCR catalyst in performing the durability test was set at 100 mm, and the catalyst bed temperature was measured using thermometers 13 and 14 set at the measurement place.

Denitration performance of SCR was measured using model gas under the above-described condition. In addition, platinum concentration of SCR after the test was measured. These results are shown in Table 2. Here C300 represents $NO_x$ purification ratio at 300° C., C500 represents $NO_x$ purification ratio at 500° C., and $N_2O$@300° C. represents $N_2O$ discharge concentration (ppm) at 300° C.

Example 2

Production of the Oxidation Catalyst DOC (2)

=A Lower Layer=

An aqueous solution of platinum nitrate and an aqueous solution of palladium nitrate were mixed, as raw materials of the noble metal component, to obtain a Pt—Pd mixed solution. Here, ratio of platinum and palladium was set at 5:1, in weight ratio.

Next, onto 300 g of alumina powder of Example 1, as a base material, the above-described Pt—Pd mixed solution was impregnated and supported, so as to attain 0.68% by weight in the noble metal equivalent, to obtain Pt—Pd-supported alumina powder.

And, the Pt—Pd-supported alumina powder and water were put into a ball mill and milled till specified particle diameter is attained, to obtain slurry.

Subsequently, an integral structure-type substrate, that is, a honeycomb flow-through-type cordierite substrate (300 cells/8 mil, a diameter of 24 mm, a length of 66 mm), was immersed into this slurry, and coated so as to attain a catalyst supported amount of 110 g/L per unit volume, by a wash-coat method, then dried at 150° C. for 1 hour and calcined at 500° C. for 2 hours under atmosphere to obtain a catalyst already coated with the lower layer of DOC (2).

=An Upper Layer=

Slurry was obtained by the same procedure as in the lower layer, except that, onto 300 g of alumina powder of Example 1, as a base material, the above-described Pt—Pd mixed solution was impregnated and supported, so as to attain 1.39% by weight in the noble metal equivalent.

Subsequently, the above-described catalyst already coated with the lower catalyst layer was immersed into this slurry, and coated so as to attain a catalyst supported amount of 90 g/L per unit volume, by a wash-coat method, then dried at 150° C. for 1 hour and calcined at 500° C. for 2 hours under atmosphere to obtain DOC (2) (amount of noble metal: 2.0 g/L).

Free Pt particle ratio (%) of the obtained oxidation catalyst DOC (2) was measured by the above method, and the result is shown in Table 1.

Example 3

An aqueous solution of platinum nitrate and an aqueous solution of palladium nitrate were mixed, as raw materials of the noble metal component, to obtain a Pt—Pd mixed solution. Here, ratio of platinum and palladium was set at 3:1, in weight ratio.

Next, onto 300 g of alumina powder of Example 1, as a base material, the above Pt—Pd mixed solution was impregnated and supported, so as to attain 1.0% by weight in the noble metal equivalent, to obtain Pt—Pd-supported alumina powder.

After that, oxidation catalyst DOC (3) (amount of the noble metal: 2.0 g/L) was obtained similarly as in DOC (1) of Example 1, except that refined sugar was excluded from the raw material of slurry components.

Free Pt particle ratio (%) of the obtained oxidation catalyst DOC (3) was measured by the above method, and the result is shown in Table 1.

Next, the Pt scattering test and subsequent Pt concentration measurement were performed. Specifically, they were performed under the same apparatus configuration and treatment condition as in Example 1. The result is shown in Table 2.

Comparative Example 1

The oxidation catalyst DOC (4) (amount of the noble metal: 2.0 g/L) shown in Table was obtained similarly as in DOC (1) of Example 1, except that refined sugar was excluded from the raw material of slurry components.

Free Pt particle ratio (%) of the obtained oxidation catalyst DOC (4) was measured by the above method, and the result is shown in Table 1.

Next, the Pt scattering test and subsequent Pt concentration measurement were performed. Specifically, they were performed under the same apparatus configuration and treatment condition as in Example 1. The result is shown in Table 2.

Comparative Example 2

The oxidation catalyst DOC (5) (amount of the noble metal: 2.0 g/L) was obtained similarly as in DOC (2) of Example 2, except that ratio of platinum and palladium was set at 6.2:1 in weight ratio.

Free Pt particle ratio (%) of the obtained oxidation catalyst DOC (5) was measured by the above method, and the result is shown in Table 1.

Next, the Pt scattering test and subsequent Pt concentration measurement were performed. Specifically, they were performed under the same apparatus configuration and treatment condition as in Example 1. The result is shown in Table 2.

Example 4

Production of a Catalyzed Combustion Filter CSF (1)

An aqueous solution of platinum nitrate and an aqueous solution of palladium nitrate were mixed, as raw materials of the noble metal component, to obtain a Pt—Pd mixed solution. Here, ratio of platinum and palladium was set at 2:1, in weight ratio.

Next, onto 300 g of alumina powder of Example 1, as a base material, the above Pt—Pd mixed solution was impregnated and supported, so as to attain 3.0% by weight in Pt and Pd equivalent, to obtain Pt—Pd-supported alumina powder.

And, the Pt—Pd-supported alumina powder and water were put into a ball mill and milled till specified particle diameter is attained to obtain slurry. Subsequently, an integral structure-type substrate, that is, a honeycomb wall-flow-type cordierite substrate (200 cells/12 mil, a diameter of 24 mm, a length of 66 mm), was immersed into this slurry, and coated so as to attain a catalyst supported amount of 28 g/L per unit volume, by a wash-coat method, then dried at 150° C. for 1 hour and calcined at 500° C. for 2 hours under atmosphere to obtain CSF (1) (amount of noble metal: 0.84 g/L).

Free Pt particle ratio (%) of the obtained catalyzed combustion filter CSF (1) was measured by the above-described method, and the result is shown in Table 1.

Next, the Pt scattering test and subsequent Pt concentration measurement were performed. Specifically, they were performed under the same apparatus configuration and treatment condition as in Example 1 except that the catalyzed combustion filter CSF (1) was used instead of the oxidation catalyst DOC (1). The result is shown in Table 2.

Example 5

The catalyzed combustion filter CSF (2) (amount of the noble metal: 0.84 g/L) was obtained similarly as in CSF (1) of Example 4, except that ratio of platinum and palladium was set at 1.5:1 in weight ratio.

Free Pt particle ratio (%) of the obtained catalyzed combustion filter CSF (2) was measured by the above method, and the result is shown in Table 1.

Next, the Pt scattering test and subsequent Pt concentration measurement were performed. Specifically, they were performed under the same apparatus configuration and treatment condition as in Example 4. The result is shown in Table 2.

Example 6

The catalyzed combustion filter CSF (3) was obtained similarly as in CSF (1) of Example 4, except that a nitric acid solution of diamminedinitroplatinum was used instead of an aqueous solution of platinum nitrate, as a raw material of the noble metal component.

Free Pt particle ratio (%) of the obtained catalyzed combustion filter CSF (3) was measured by the above-described method, and the result is shown in Table 1.

Next, the Pt scattering test and subsequent Pt concentration measurement were performed. Specifically, they were performed under the same apparatus configuration and treatment condition as in Example 4. The result is shown in Table 2.

Example 7

The catalyzed combustion filter CSF (4) (amount of the noble metal: 0.84 g/L) was obtained similarly as in CSF (1) of Example 4, except that ratio of platinum and palladium was set at 2.35:1 in weight ratio.

Free Pt particle ratio (%) of the obtained catalyzed combustion filter CSF (4) was measured by the above method, and the result is shown in Table 1.

Next, the Pt scattering test and subsequent Pt concentration measurement were performed. Specifically, they were performed under the same apparatus configuration and treatment condition as in Example 4. The result is shown in Table 2.

Comparative Example 3

Onto 300 g in total of powder, obtained by mixing 70 g of alumina powder of Example 1, as a base material, and 230 g of a composite oxide powder, where ratio of $CeO_2$ and $ZrO_2$ is 7:3, an aqueous solution of platinum nitrate, as a raw material of the noble metal component, was impregnated and supported, so as to attain 3.0% by weight in Pt equivalent.

After that, by performing catalyst preparation in and subsequent to slurry preparation by the same procedure as in CSF (1) of Example 4, the catalyzed combustion filter CSF (5) (amount of the noble metal: 0.84 g/L) was obtained.

Free Pt particle ratio (%) of the obtained catalyzed combustion filter CSF (5) was measured by the above method, and the result is shown in Table 1.

Next, the Pt scattering test and subsequent Pt concentration measurement were performed. Specifically, they were performed under the same apparatus configuration and treatment condition as in Example 1. The result is shown in Table 2.

Comparative Example 4

Onto 300 g of alumina powder of Example 1, as a base material, an ethanol amine solution of platinum hydroxide (IV), as a raw material of the noble metal component, was impregnated and supported, so as to attain 2.0% by weight in Pt equivalent, to obtain Pt-supported alumina powder. Then, onto the above Pt-supported alumina powder, an aqueous solution of palladium nitrate was impregnated and supported, so as to attain 1.0% by weight in Pd equivalent, to obtain Pt—Pd-supported alumina powder (Pt:Pd=2:1).

After that, by performing catalyst preparation in and subsequent to slurry preparation by the same procedure as in CSF (1) of Example 4, the catalyzed combustion filter CSF (6) (amount of the noble metal: 0.84 g/L) was obtained.

Free Pt particle ratio (%) of the obtained catalyzed combustion filter CSF (6) was measured by the above method, and the result is shown in Table 1.

Next, the Pt scattering test and subsequent Pt concentration measurement were performed. Specifically, they were performed under the same apparatus configuration and treatment condition as in Example 4, except by using the Comparative catalyzed combustion filter CSF (6). The result is shown in Table 2.

Comparative Example 5

The catalyzed combustion filter CSF (7) (amount of the noble metal: 0.84 g/L) was obtained similarly as in CSF (1) of Example 4, except that ratio of platinum and palladium was set at 3:1 in weight ratio.

Free Pt particle ratio (%) of the obtained catalyzed combustion filter CSF (7) was measured by the above method, and the result is shown in Table 1.

Next, the Pt scattering test and subsequent Pt concentration measurement were performed. Specifically, they were performed under the same apparatus configuration and treatment condition as in Example 4, except by using the Comparative catalyzed combustion filter CSF (7). The result is shown in Table 2.

Comparative Example 6

A nitric acid solution of diamminedinitroplatinum and an aqueous solution of palladium nitrate were mixed, as raw materials of the noble metal components, to obtain a Pt—Pd mixed solution. In this case, ratio of platinum and palladium was set at 3:1, in weight ratio.

After that by performing catalyst preparation in and subsequent to slurry preparation by the same procedure as in CSF (1) of Example 4, the catalyzed combustion filter CSF (8) (amount of the noble metal: 0.84 g/L) was obtained.

Free Pt particle ratio (%) of the obtained catalyzed combustion filter CSF (8) was measured by the above method, and the result is shown in Table 1.

Next, the Pt scattering test and subsequent Pt concentration measurement were performed. Specifically, they were performed under the same apparatus configuration and treatment condition as in Example 4, except by using the Comparative catalyzed combustion filter CSF (8). The result is shown in Table 2.

Comparative Example 7

The catalyzed combustion filter CSF (9) (amount of the noble metal: 0.84 g/L) was obtained similarly as in CSF (1) of Example 4, except that ratio of platinum and palladium was set at 2.5:1 in weight ratio.

Free Pt particle ratio (%) of the obtained catalyzed combustion filter CSF (9) was measured by the above method, and the result is shown in Table 1.

Next, the Pt scattering test and subsequent Pt concentration measurement were performed. Specifically, they were performed under the same apparatus configuration and treatment condition as in Example 4, except by using the Comparative catalyzed combustion filter CSF (9). The result is shown in Table 2.

TABLE 1

|  |  | Pt/Pd | Ratio of free Pt particle [%] | Initial noble metal particle diameter [nm] |
|---|---|---|---|---|
| Example 1 | DOC (1) | 3/1 | 35 | 4.52 |
| Example 2 | DOC (2) | 5/1 | 12 | — |
| Example 3 | DOC (3) | 3/1 | 3 | — |
| Comparative Example 1 | DOC (4) | 3/1 | 35 | 3.36 |
| Comparative Example 2 | DOC (5) | 6.2/1 | 25 | — |
| Example 4 | CSF (1) | 2/1 | 0 | — |
| Example 5 | CSF (2) | 1.5/1 | 0 | — |
| Example 6 | CSF (3) | 2/1 | 0 | — |
| Example 7 | CSF (4) | 2.35/1 | 3 | — |
| Comparative Example 3 | CSF (5) | 1/0 | 100 | — |
| Comparative Example 4 | CSF (6) | 2/1 | 40 | — |
| Comparative Example 5 | CSF (7) | 3/1 | 12 | — |
| Comparative Example 6 | CSF (8) | 3/1 | 12 | — |
| Comparative Example 7 | CSF (9) | 2.5/1 | 6 | — |

TABLE 2

| | | | | Result of Pt scattering test | | |
|---|---|---|---|---|---|---|
| | | Pt/Pd | C500/C300 | N$_2$O@300° C. [ppm] | Judgment | SCR Pt concentration [ppm] |
| Example 1 | DOC (1) | 3/1 | 0.97 | 6.6 | OK | 9 |
| Example 2 | DOC (2) | 5/1 | 1.02 | 5.7 | OK | 9 |
| Example 3 | DOC (3) | 3/1 | 1.04 | 5.5 | OK | 7 |
| Comparative Example 1 | DOC (4) | 3/1 | 0.58 | 14.9 | NG | 22 |
| Comparative Example 2 | DOC (5) | 6.2/1 | 0.76 | 10.3 | NG | 18 |
| Example 4 | CSF (1) | 2/1 | 1.04 | 5.2 | OK | 6 |
| Example 5 | CSF (2) | 1.5/1 | 1.08 | 4.9 | OK | 5 |
| Example 6 | CSF (3) | 2/1 | 1.07 | 5 | OK | 6 |
| Example 7 | CSF (4) | 2.35/1 | 0.91 | 8.1 | OK | 11 |
| Comparative Example 3 | CSF (5) | 1/0 | 0.34 | 21.5 | NG | 32 |
| Comparative Example 4 | CSF (6) | 2/1 | 0.81 | 8.8 | NG | 15 |
| Comparative Example 5 | CSF (7) | 3/1 | 0.54 | 13.5 | NG | 26 |
| Comparative Example 6 | CSF (8) | 3/1 | 0.66 | 12.1 | NG | 23 |
| Comparative Example 7 | CSF (9) | 2.5/1 | 0.75 | 10.2 | NG | 15 |

[Evaluation]

From the results of the above Table 1, it is understood that, in Examples 1 to 3, according to the present invention, because the noble metal component of the oxidation catalyst (DOC) contains platinum and palladium, and average particle diameter of the noble metal is large, and ratio of platinum particles existing alone is specified % or less, even when catalyst bed temperature of DOC increases up to 900° C., volatilization of platinum from the oxidation catalyst (DOC) is suppressed, and activity of the selective reduction catalyst (SCR) is maintained.

In addition, from the results of the above Table 1, it is understood that, in Examples 4 to 6, according to the present invention, because the noble metal component of the catalyzed combustion filter (CSF) contains platinum and palladium, and average particle diameter of the noble metal is large, and ratio of platinum particles existing alone is specified % or less, even when catalyst bed temperature of CSF increases up to 900° C., volatilization of platinum from the catalyzed combustion filter (CSF) is suppressed, and activity of the selective reduction-type catalyst (SCR) is maintained. And, from these results, it is understood that by combined use of the oxidation catalyst (DOC) relevant to the present invention described in Examples 1 to 3, and the catalyzed combustion filter (CSF) relevant to the present invention described in Examples 4 to 6, still more significant action effect is obtained.

It should be noted that in the denitration performance test of the selective reduction catalyst (SCR), condition of NO:NO$_2$=4:1 was used for model gas. Although this is not necessarily NO:NO$_2$ ratio providing high reactivity, reason for performing evaluation under condition which cannot be said ideal is that practical running state of an automobile was assumed. In running state of a practical automobile, NO:NO$_2$ ratio in exhaust gas varies every moment, and NO:NO$_2$ ratio suitable for the SCR reaction is not necessarily maintained. In spite of under such condition, the present Examples showed high denitration performance, therefore it is understood that the exhaust gas purification apparatus of the present invention can exert superior NO$_x$ purification performance even in NO:NO$_2$ ratio assuming such a practical running state.

On the contrary, in Comparative Examples 1 to 11, different from the present invention, because the noble metal component of a conventional type oxidation catalyst (DOC) or catalyzed combustion filter (CSF) does not contain palladium, or even when platinum and palladium are contained, ratio of platinum particles existing alone is larger than specified %, when catalyst bed temperature increases up to 900° C., volatilization of platinum from the oxidation catalyst (DOC) or the catalyzed combustion filter (CSF) cannot be suppressed, and activity of the selective reduction catalyst (SCR) cannot be maintained.

REFERENCE SIGNS LIST

1 diesel engine
2 exhaust gas passage
3 reducing agent spray means
4 oxidation catalyst (DOC)
5 selective reduction catalyst (SCR)
6 combustion filter (DPF)
7 selective reduction catalyzed combustion filter (SCRF)
8 catalyzed combustion filter (CSF)
9 air passage
10 tubular furnace
11 DOC or CSF sample
12 SCR sample
13 catalyst bed thermometer of SCR
14 catalyst bed thermometer of DOC or CSF

INDUSTRIAL APPLICABILITY

The present invention can be used for purification technology of NO$_x$ generated by lean combustion, for example, including for the diesel automobile applications, for mobile applications such as a gasoline automobile or a ship, or for stationary applications such as a power generator.

The invention claimed is:

1. An exhaust gas purification apparatus, comprising:
an oxidation catalyst (DOC) comprising a noble metal component for oxidizing nitrogen oxides (NO) in an exhaust gas discharged from a diesel engine, the oxidation catalyst (DOC) having a supporting amount of the noble metal of 0.5 to 4.0 g/L in metal equivalent, a catalyzed combustion filter (CSF) comprising a noble metal component for removing particulate components (PM) in exhaust gas by combustion (oxidation), the catalyzed combustion filter (CSF) having a supported amount of the noble metal of 0.1 to 2.0 g/L in metal equivalent, a reducing agent spraying means for supplying the reducing agent selected from a urea component or an ammonia component, and a selective reduction catalyst (SCR) not comprising a noble metal for removing by reduction nitrogen oxides ($NO_x$) by contacting with the reducing agent, wherein the oxidation catalyst (DOC), the catalyzed combustion filter (CSF), the reducing agent spraying means, and the selective reduction catalyst (SCR) are arranged in this order from the upstream side of an exhaust gas passage, activity of the selective reduction catalyst (SCR) is maintained by setting that the noble metal component of the oxidation catalyst (DOC) comprises platinum and palladium, and ratio of platinum particles existing alone is 20% or less, and by suppressing volatilization of platinum from the oxidation catalyst (DOC), even when catalyst bed temperature increases up to 900° C., and activity of the selective reduction catalyst (SCR) is maintained by setting that the noble metal component of the catalyzed combustion filter (CSF) comprises platinum and palladium, and ratio of platinum particles existing alone is 3% or less, so as to suppress volatilization of platinum from the catalyzed combustion filter (CSF), even when catalyst bed temperature increases up to 900° C.

2. The exhaust gas purification apparatus according to claim 1, wherein the selective reduction catalyst (SCR) comprises zeolite or crystalline metal aluminophosphate.

3. The exhaust gas purification apparatus according to claim 1, wherein the oxidation catalyst (DOC) has a ratio of platinum and palladium of 1:1 to 11:2 in weight equivalent.

4. The exhaust gas purification apparatus according to claim 1, wherein the oxidation catalyst (DOC) has a coating amount of an oxidizing component, which composes a catalyst layer, of 100 to 300 g/L.

5. The exhaust gas purification apparatus according to claim 1, wherein an amount of platinum which volatilizes from the oxidation catalyst (DOC) and adheres to the selective reduction catalyst (SCR) is 12 ppm or less, after 20 hours have passed.

6. The exhaust gas purification apparatus according to claim 1, wherein the catalyzed combustion filter (CSF) has a ratio of platinum and palladium of 1:1 to 11:4, in weight equivalent.

7. The exhaust gas purification apparatus according to claim 1, wherein the catalyzed combustion filter (CSF) has a coated amount of an oxidizing component, which composes a catalyst layer, of 5 to 150 g/L.

8. The exhaust gas purification apparatus according to claim 1, wherein an amount of platinum which volatilizes from the catalyzed combustion filter (CSF) and adheres to the selective reduction catalyst (SCR) is 12 ppm or less, after 20 hours have passed.

9. The exhaust gas purification apparatus according to claim 1, wherein the noble metal component of the oxidation catalyst (DOC) and/or catalyzed combustion filter (CSF) is supported on a substrate having an integral-type structure.

10. The exhaust gas purification apparatus according to claim 9, wherein the substrate having an integral-type structure is a flow-through-type honeycomb structure and/or a wall-flow-type honeycomb structure.

11. The exhaust gas purification apparatus according to claim 1, further comprising an ammonia oxidation catalyst (AMOX) arranged after the selective reduction catalyst (SCR).

* * * * *